(12) United States Patent
Tanaka et al.

(10) Patent No.: US 9,128,567 B2
(45) Date of Patent: Sep. 8, 2015

(54) SEGMENTED WAVEGUIDE CORE TOUCH SENSOR SYSTEMS AND METHODS

(71) Applicant: ELO TOUCH SOLUTIONS, INC., Menlo Park, CA (US)

(72) Inventors: Yoshikazu Tanaka, Yokohama Kanagawa (JP); Joel C. Kent, Fremont, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 112 days.

(21) Appl. No.: 13/682,621

(22) Filed: Nov. 20, 2012

(65) Prior Publication Data

US 2014/0139494 A1    May 22, 2014

(51) Int. Cl.
*G06F 3/043* (2006.01)
(52) U.S. Cl.
CPC ................................ *G06F 3/0436* (2013.01)
(58) Field of Classification Search
CPC ...... G06F 3/043; G06F 3/0433; G06F 3/0436
USPC ................ 345/173–179; 178/18.04; 310/363; 341/34
See application file for complete search history.

(56) References Cited

U.S. PATENT DOCUMENTS

| | | | | |
|---|---|---|---|---|
| 4,642,506 A * | 2/1987 | Lewis | ....................... | 310/313 D |
| 4,700,176 A * | 10/1987 | Adler | .............................. | 341/20 |
| 4,825,212 A * | 4/1989 | Adler et al. | .................... | 345/177 |
| 6,091,406 A * | 7/2000 | Kambara et al. | .............. | 345/177 |
| 6,636,201 B1 | 10/2003 | Gomes et al. | | |
| 7,274,358 B2 | 9/2007 | Kent | | |
| 7,920,133 B2 | 4/2011 | Tsumura et al. | | |
| 2003/0076308 A1* | 4/2003 | Sano et al. | ..................... | 345/177 |
| 2004/0027342 A1* | 2/2004 | Katsuki et al. | ................ | 345/177 |
| 2004/0263492 A1* | 12/2004 | Chao et al. | ..................... | 345/177 |
| 2005/0035685 A1* | 2/2005 | Tanaka et al. | ............. | 310/313 D |
| 2005/0156911 A1* | 7/2005 | Tanaka et al. | ................. | 345/177 |
| 2005/0248547 A1* | 11/2005 | Kent et al. | ...................... | 345/177 |
| 2006/0132000 A1* | 6/2006 | Katsuki et al. | ................ | 310/363 |
| 2007/0295541 A1* | 12/2007 | Yeh | ........................... | 178/18.04 |
| 2008/0106528 A1* | 5/2008 | Chang et al. | .................. | 345/177 |
| 2008/0117187 A1* | 5/2008 | Tsumura | ....................... | 345/177 |
| 2008/0316187 A1* | 12/2008 | Sano et al. | ..................... | 345/173 |
| 2011/0234545 A1* | 9/2011 | Tanaka et al. | ................. | 345/177 |
| 2013/0093731 A1* | 4/2013 | Scharff et al. | ................. | 345/177 |

* cited by examiner

*Primary Examiner* — Dwayne Bost
*Assistant Examiner* — Darlene M Ritchie
(74) *Attorney, Agent, or Firm* — Alston & Bird LLP

(57) ABSTRACT

Systems and related methods providing for touch sensors having a waveguide reflective array within a major reflective array are discussed herein. A touch sensor may include a substrate configured to propagate surface acoustic waves. The substrate may include a front surface, a back surface including the reflective arrays, and a connecting surface joining the front surface and the back surface. The reflective arrays may be configured to cause the surface acoustic waves to propagate from the back surface, via the connecting surface, to the front surface. The touch censor may further include circuitry configured to determine a coordinate of a touch event on the front surface based on received attenuations in the surface acoustic waves.

18 Claims, 14 Drawing Sheets

SEGMENTED WAVEGUIDE CORE TOUCH SENSOR SYSTEMS AND METHODS

FIELD

Embodiments discussed herein are related to, in general, touch sensors using surface acoustic waves to detect a touch event.

BACKGROUND

Touch sensor systems, such as those often used with displays, may act as input devices for interactive computer systems. Such systems may also be used for applications such as information kiosks, computers, order entry systems for restaurants, video displays or signage, mobile devices, etc. By integrating a touch sensor system into a computing device, the computer may provide a user an intuitive, interactive human-machine-interface.

Currently, a variety of touch sensor technologies are implemented in different types of machines. These touch technologies are built on resistive, capacitive, and acoustic properties of various components. Acoustic touch sensors, such as ultrasonic touch sensors using surface acoustic waves, are particularly advantageous when the application demands a very durable touch sensitive surface and minimal optical degradation of the displayed image.

However, the width of the border area of acoustic touch sensors may be limited by the physics and other scientific principles that are leveraged to provide touch functionality. Through applied effort, ingenuity, and innovation, solutions to this and other problems have been developed that are included in embodiments of the present invention, some examples of which are described herein.

BRIEF SUMMARY

Systems and related methods are provided related to, in general, touch sensors having narrow border regions. For example, some embodiments may include an acoustic touch apparatus comprising a substrate configured to propagate surface acoustic waves. The substrate may have a front surface and a back surface. A reflective array, as well as one or more transducers configured to generate a surface acoustic wave, may be positioned on the front and/or back surface(s). The reflective array may be configured to redirect at least a portion of the surface acoustic waves.

The reflective array may include a major reflective array and a waveguide reflective array. The major reflective array may include major reflector elements, neighboring pairs of which are substantially parallel to each other (e.g., the major reflector elements do not intersect and/or touch), wherein one or more of the major reflector elements have lengths that may define a major width dimension of the major reflective array. The waveguide reflective array may be comprised of and/or defined by waveguide reflector elements. At least one of the waveguide reflector elements may have a length that defines a waveguide width dimension that is smaller than the major width dimension. A waveguide reflector element may be disposed between two of the major reflector elements. In some embodiments more than one waveguide reflector element may be disposed between the two neighboring major reflector elements. The waveguide reflective array may define a waveguide centerline. The waveguide reflective array may be positioned relative to the major reflective array such that the waveguide centerline is within a center third of the major width dimension. In some embodiments, the waveguide centerline may be within and/or align with the centerline running through the middle of the major reflective array.

In some embodiments, at least one waveguide reflector element has a reflector angle substantially parallel to reflector angles of an adjacent reflector element, such as an adjacent major reflector element and/or an adjacent waveguide reflector element. In some embodiments, each of the waveguide reflector elements may have a reflector angle parallel to reflector angles of the major reflector elements.

In some embodiments, the major reflector elements may be disposed such that center-to-center spacing between neighboring major reflector elements define a distance equal to at least one positive integer multiple of the surface acoustic waves' wavelength. The waveguide reflector elements may be disposed within regions defined by the center-to-center spacing between neighboring major reflector elements such that each of the waveguide reflector elements forms a center-to-center interval with at least one of an adjacent waveguide reflector element and an adjacent waveguide reflector element and the center-to-center interval is equal to at least one positive integer multiple of the surface acoustic waves' wavelength.

In some embodiments, at least one waveguide reflector element and/or at least one major reflector element includes a focusing shape. In some examples, at least one of the major reflector elements has a major element focusing shape and at least one of the waveguide reflector elements has a waveguide element focusing shape where the major element focusing shape is different from the waveguide element focusing shape.

In some embodiments, the waveguide reflective array may be defined by major reflector elements that are staggered relatively to each other. As such, both the major reflective array and the waveguide reflective array comprise and are defined by the same waveguide reflector elements.

In some embodiments, the acoustic touch apparatus may further include a transmitting transducer configured to generate and propagate the surface acoustic waves in a prevailing direction along the major reflective array and the waveguide reflective array. The substrate may include a curved connecting surface joining the front surface and the back surface. The border region may be at the back surface of the substrate. The transmitting transducer may be coupled to the back surface. The major reflective array may be configured to cause the surface acoustic waves to propagate from the back surface, via the connecting surface, and to the front surface. The waveguide reflective array may be configured to: concentrate energy of the surface acoustic waves (e.g., within the major reflective array) propagating in the reflective array; cause the surface acoustic waves to propagate from the back surface, via the connecting surface, and to the front surface; and attenuate spurious waves scattered by the major reflective array.

The major reflector elements may be disposed such that: center-to-center spacings between neighboring major reflector elements define a distance equal to positive integer multiples of the surface acoustic waves' wavelength; and the center-to-center spacings between neighboring major reflector elements are comparatively greater at a first portion of the major reflective array closer to the transmitting transducer and smaller at a second portion of the major reflective array farther from the transmitting transducer.

In some embodiments, the acoustic touch apparatus may further include a receiving transducer configured to receive the surface acoustic waves propagating in a prevailing direction along the major reflective array and the waveguide reflective array. The substrate may include a curved connecting surface joining the front surface and the back surface. The border regions may be at the back surface of the substrate. The receiving transducer may be coupled to the back surface. The major reflective array may be configured to cause the surface acoustic waves to propagate to the receiving transducer. The waveguide reflective array may be configured to concentrate energy of the surface acoustic waves propagating in the prevailing direction of the waveguide reflective array; cause the surface acoustic waves to propagate from the front surface, via the connecting surface, and to the back surface; and attenuate spurious waves scattered by the major reflective array.

The major reflector elements may be disposed such that: center-to-center spacings between neighboring the major reflector elements have a distance equal to positive integer multiples of the surface acoustic waves' wavelength; and the center-to-center spacing between neighboring major reflector elements are comparatively smaller at a first portion of the major reflective array further from the receiving transducer and larger at a second portion of the major reflective array closer to the receiving transducer.

In some embodiments, the major reflective array and the waveguide reflective array may be coupled to the back surface via an acoustically benign layer on the back surface.

In some embodiments, the front surface may include an active touch region. The acoustic touch apparatus may further include a controller configured to determine a coordinate of a touch on the active touch region based on detected waveform attenuations of the surface acoustic waves as a function of time, the controller coupled with a receiving acoustic wave transducer configured to receive the waveform attenuations.

In some embodiments, the substrate may include at least one border region along an edge of the back surface of the substrate. The reflective array may be disposed at the border region.

In some embodiments, the acoustic touch apparatus may further include a display device positioned such that the display device is visible through the front surface of the substrate. The back surface of the substrate may be mechanically bonded to the display device via an acoustically absorptive bonding layer. The waveguide reflective array may be configured to concentrate energy of surface acoustic waves propagating along the reflective array away from and/or generally parallel to the acoustically absorptive bonding layer.

In some embodiments, the back surface of the substrate may be mechanically bonded to a protective housing via an acoustically absorptive bonding layer. The waveguide reflective array may be configured to concentrate acoustic energy of the surface acoustic waves propagating along the reflective array away from and/or generally parallel to the acoustically absorptive bonding layer.

Some embodiments may include a method for manufacturing an acoustic touch apparatus and/or other types of touch-sensitive products and components. Some embodiments may include an acoustic touch apparatus prepared by the methods discussed herein. The method may include providing a substrate configured to propagate surface acoustic waves. For example, the substrate may include a front surface, a back surface and a connecting surface joining the front and back surface. The method may further include positioning a mask including open spaces to the back surface of the substrate. The mask may be screen printing mask, a lithographic mask, or any other type of suitable mask. The open spaces may define a reflective array including a major reflective array and a waveguide reflective array.

The method may further include applying an acoustically reflective material to the substrate such that the acoustically reflective material is disposed on the back surface in the open spaces, and curing the substrate including the acoustically reflective material.

In some embodiments, the method may further include defining the mask such that: the major reflective array includes major reflective elements, neighboring pairs of which are substantially parallel to each other and/or otherwise do no touch one another; one or more of the major reflector elements may have a length that defines the major width dimension of the major reflective array; the waveguide reflective array includes waveguide reflector elements; at least one of the waveguide reflector elements may have a length that defines a waveguide width dimension that is smaller than the major width dimension; at least one of the waveguide reflector element is disposed between two of the major reflector elements that are neighboring; the waveguide reflective array defines a waveguide centerline; and the waveguide reflective array is positioned relative to the major reflective array such that the waveguide centerline is within a center third of the major width dimension.

The method may further include defining the mask such that: the waveguide centerline is within the middle of the major width dimension; at least one waveguide reflector element has a reflector angle at least substantially parallel to reflector angles of at least one of an adjacent waveguide reflector element and/or an adjacent major reflector element; the major reflector elements are disposed such that center-to center spacing between neighboring major reflector elements define a distance equal to at least one positive integer multiple of the surface acoustic waves' wavelength; and/or at least one waveguide reflector element, at least one major reflector element, or both includes a focusing shape.

The method may further include defining the mask such that: at least one waveguide reflector element is disposed within the regions formed between the major reflector elements such that the waveguide reflector element forms a center-to-center interval with at least one of an adjacent waveguide reflector element and/or an adjacent waveguide reflector element; and the center-to-center interval is equal to at least one positive integer multiple of the surface acoustic waves' wavelength.

In some embodiments, the substrate may include an acoustically benign layer. As such, applying the acoustically reflective material to the substrate may further include applying the acoustically reflective material to the acoustically benign layer.

These characteristics as well as additional features, functions, and details of the present invention are described below. Similarly, corresponding and additional embodiments are also described below.

BRIEF DESCRIPTION OF THE DRAWINGS

Figure 1:
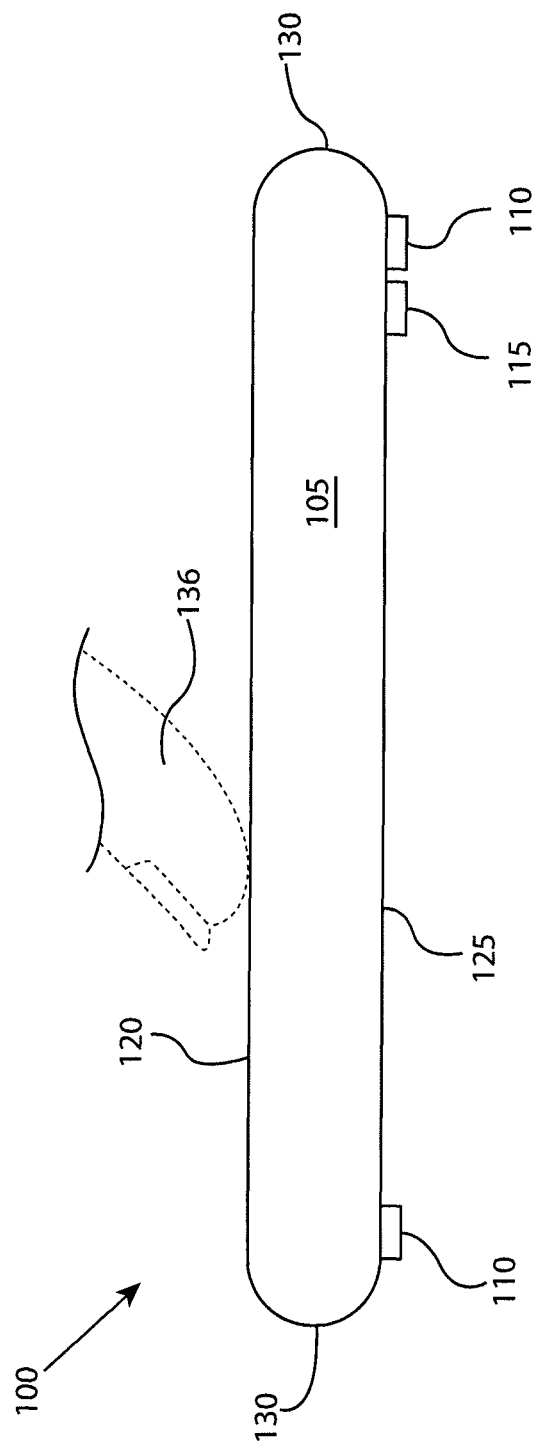
Figure 2A:
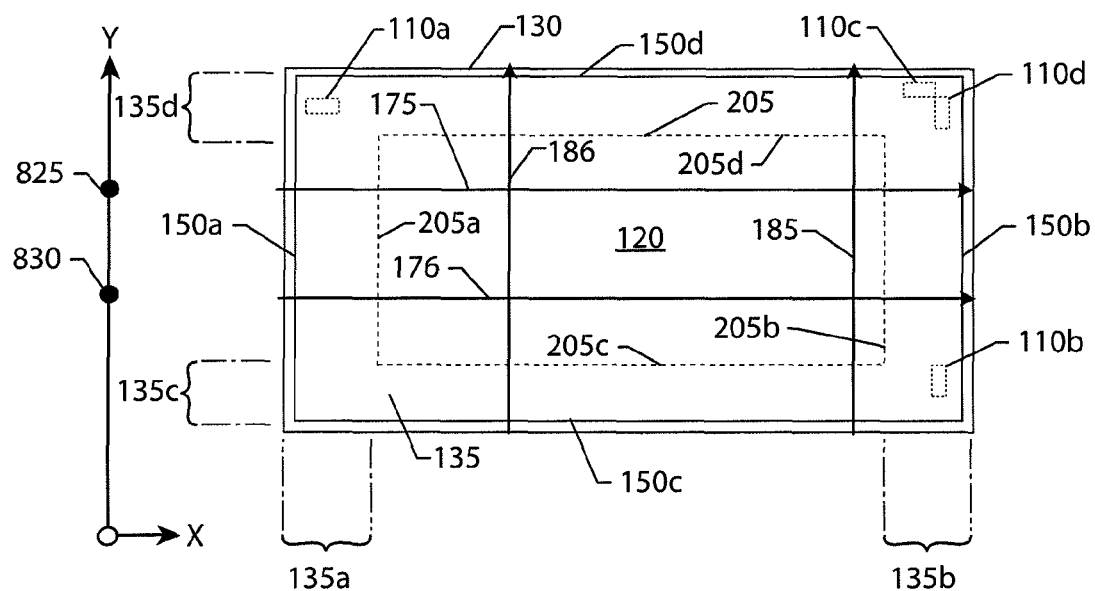
Figure 2B:
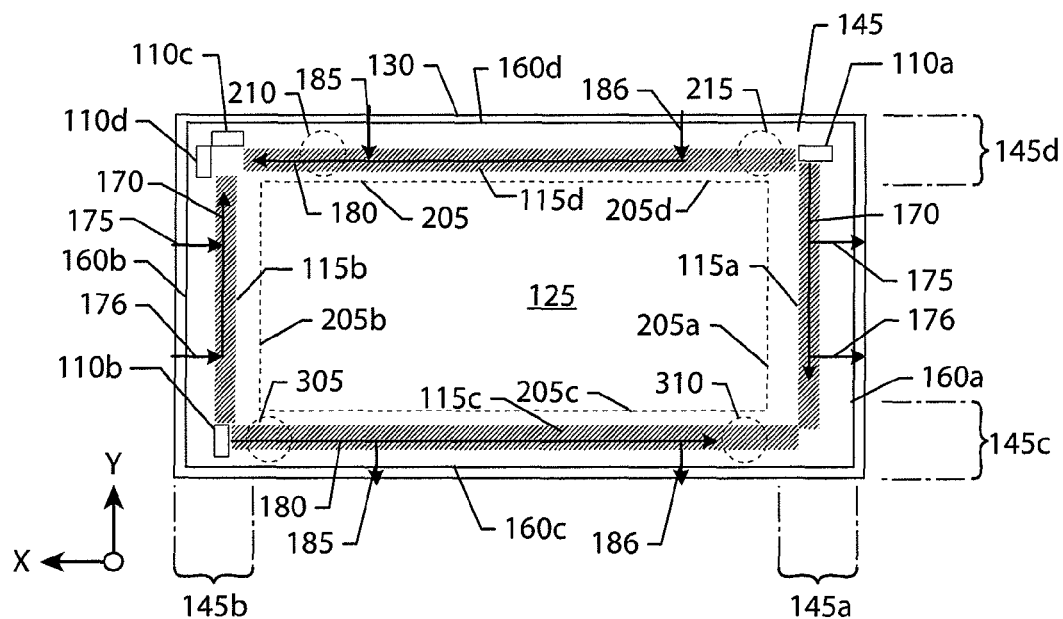
Figure 2C:
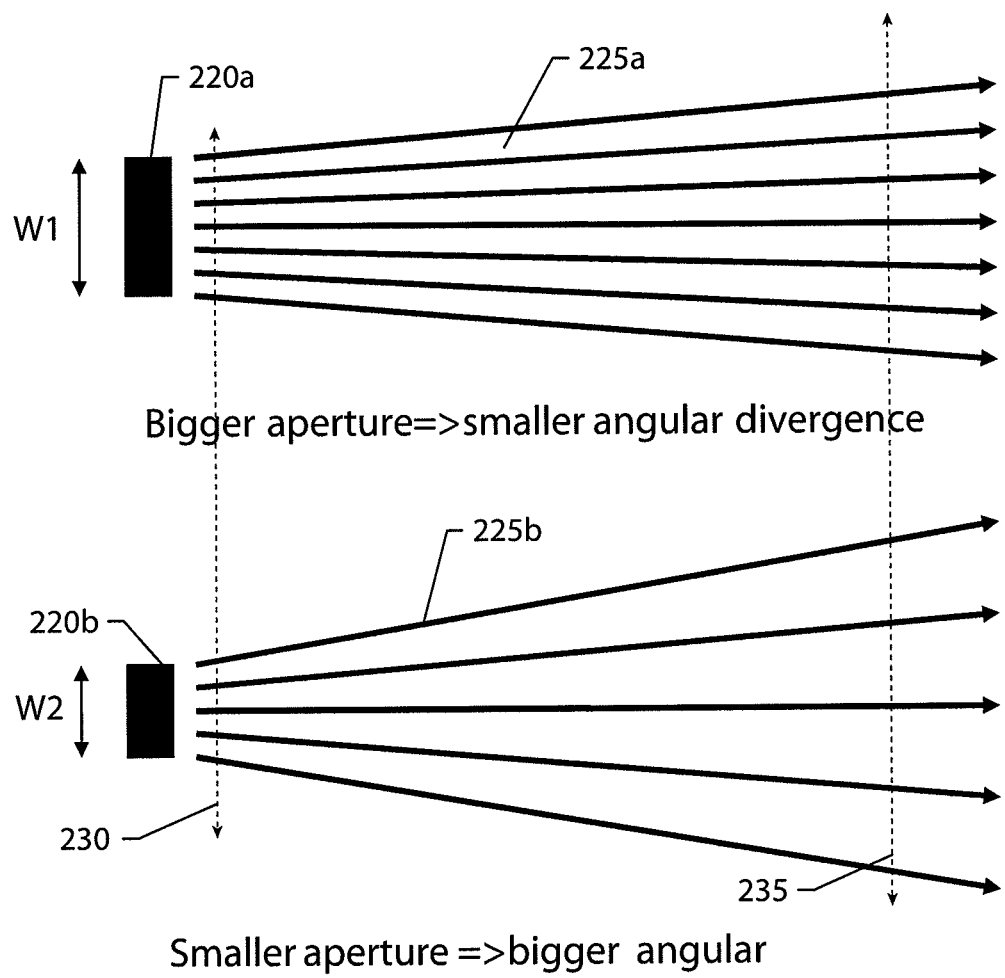
Figure 2D:
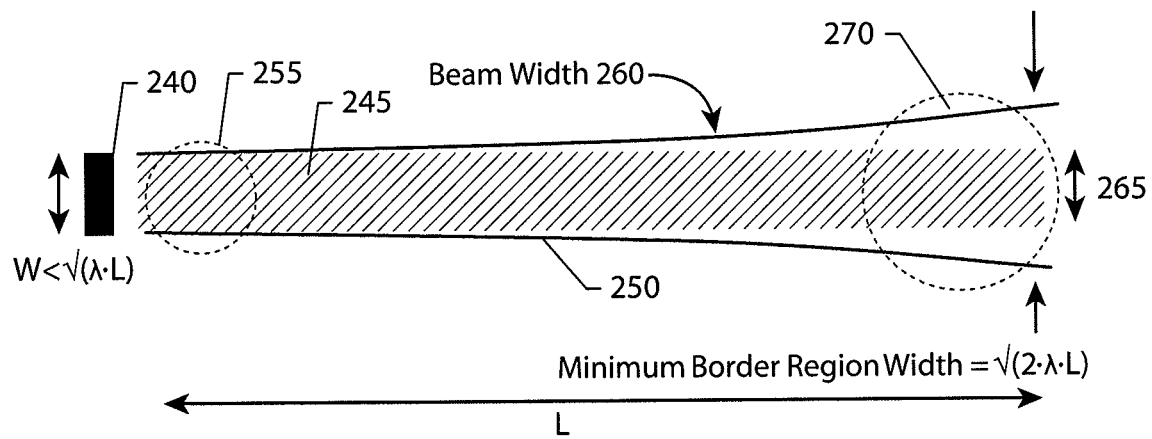
Figure 2E:
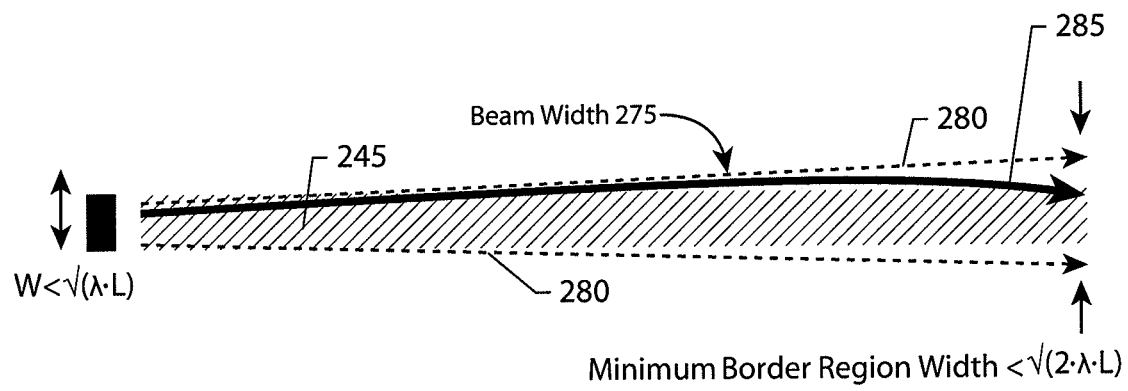
Figure 4A:
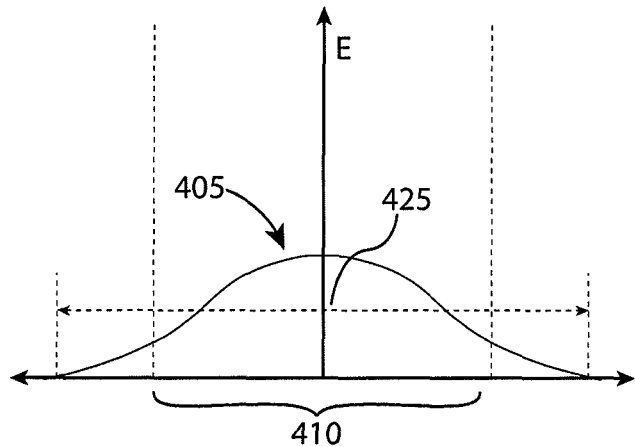
Figure 4B:
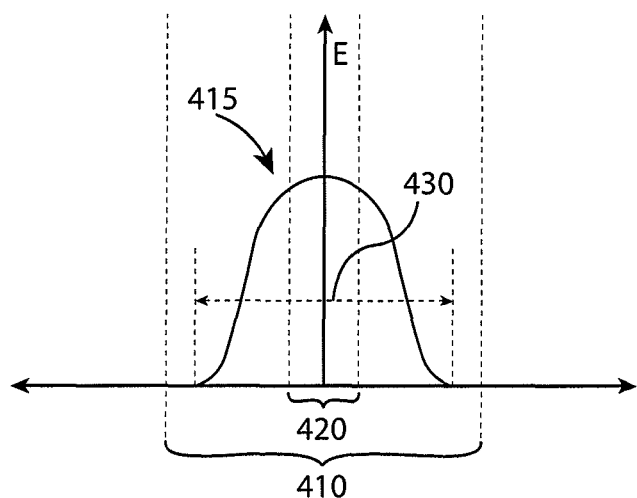
Figure 4C:
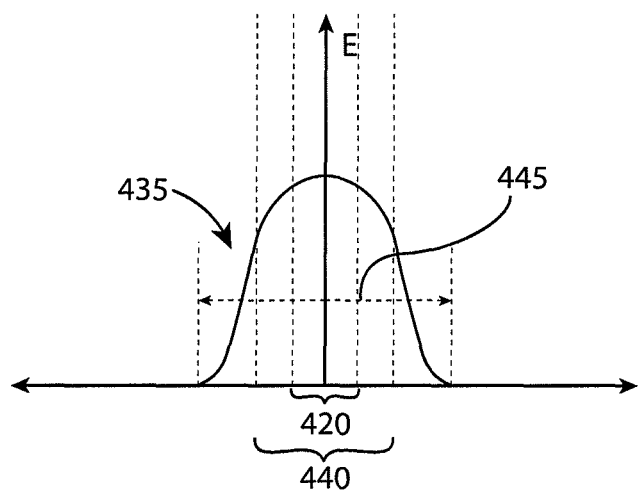
Figure 5A:
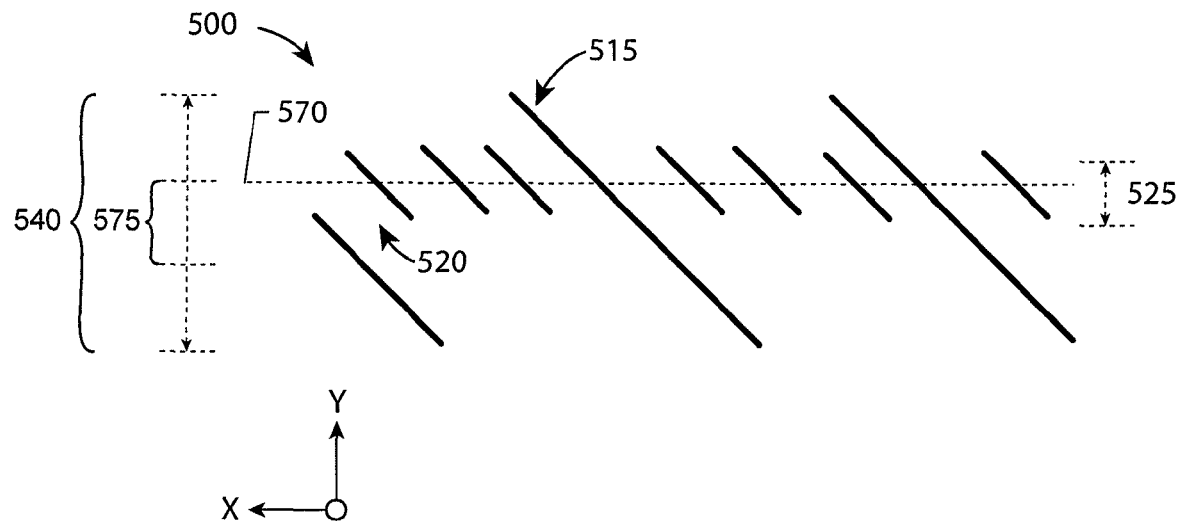
Figure 5B:
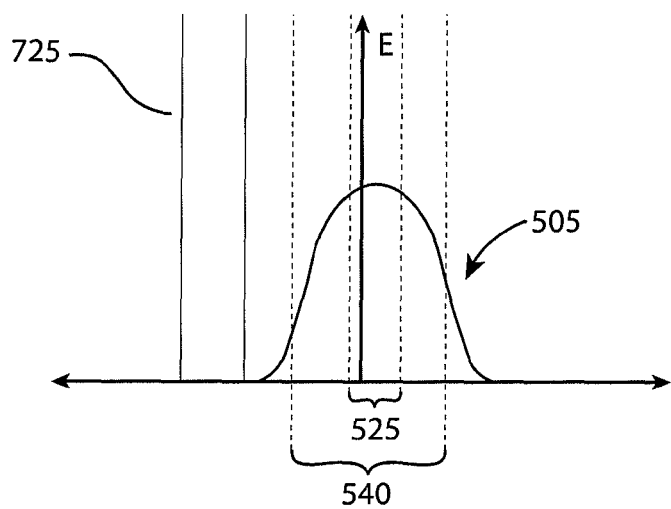
Figure 6A:
Figure 6B:
Figure 7A:
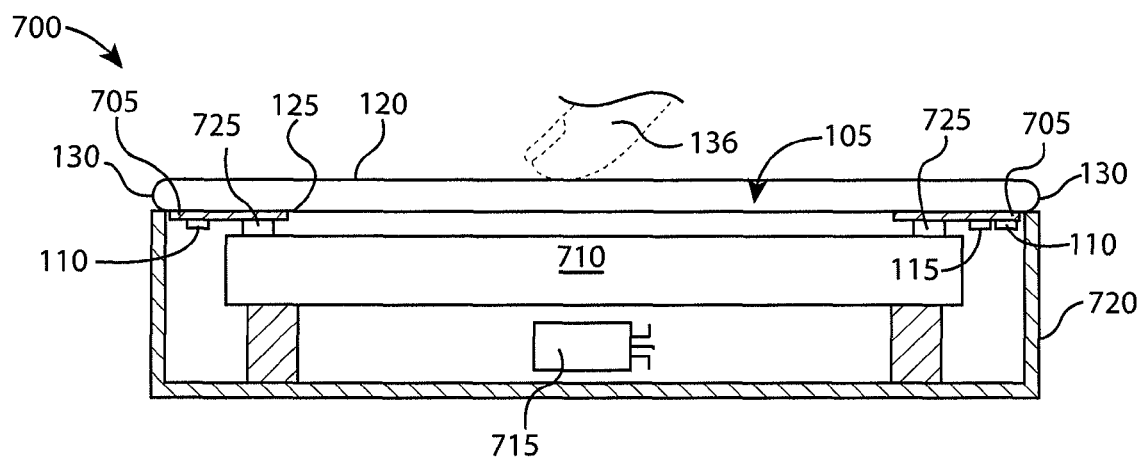
Figure 7B:
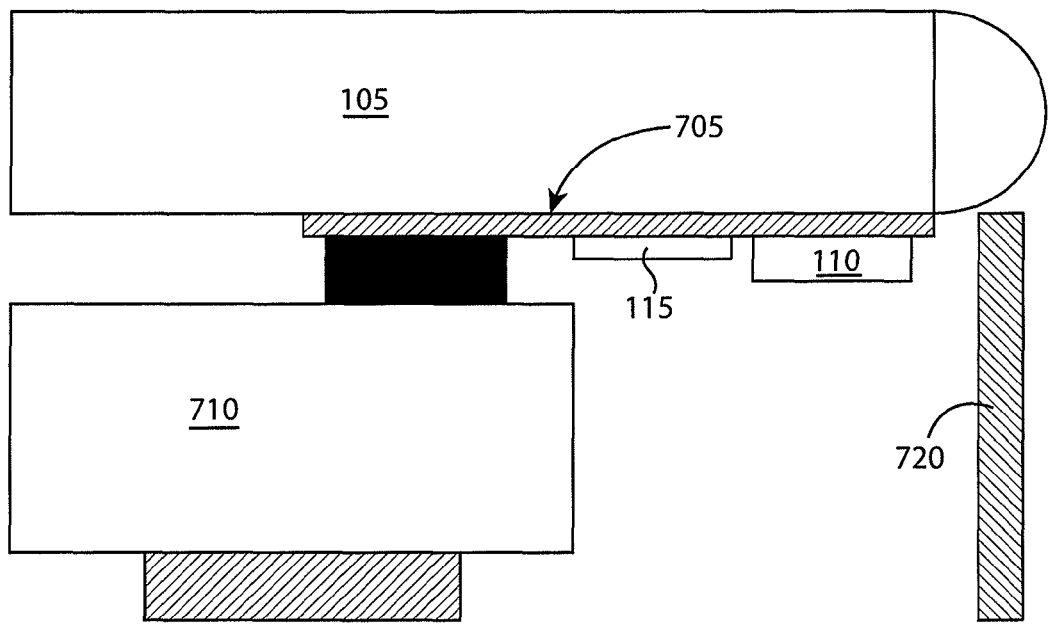
Figure 8:
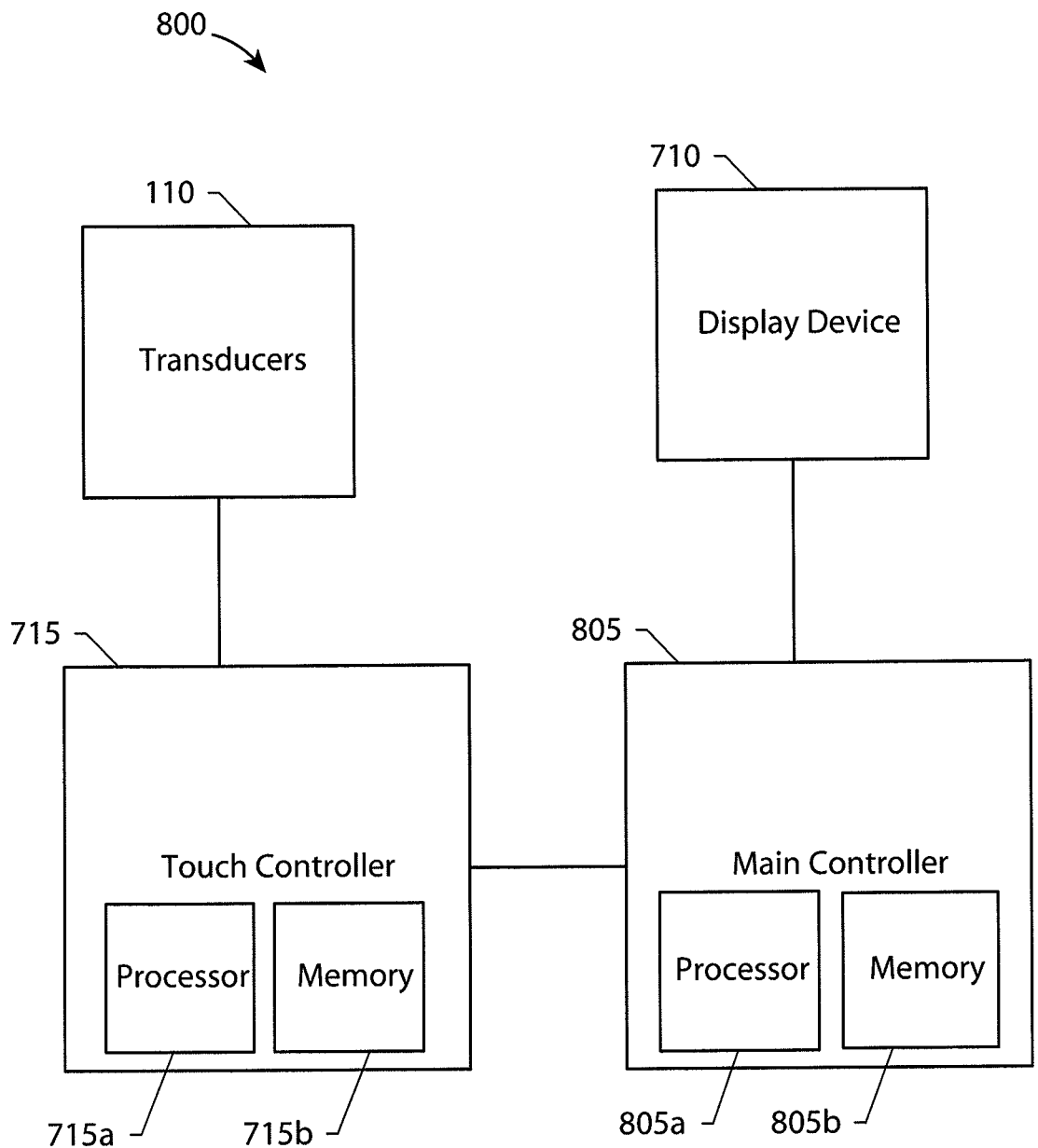
Figure 9:
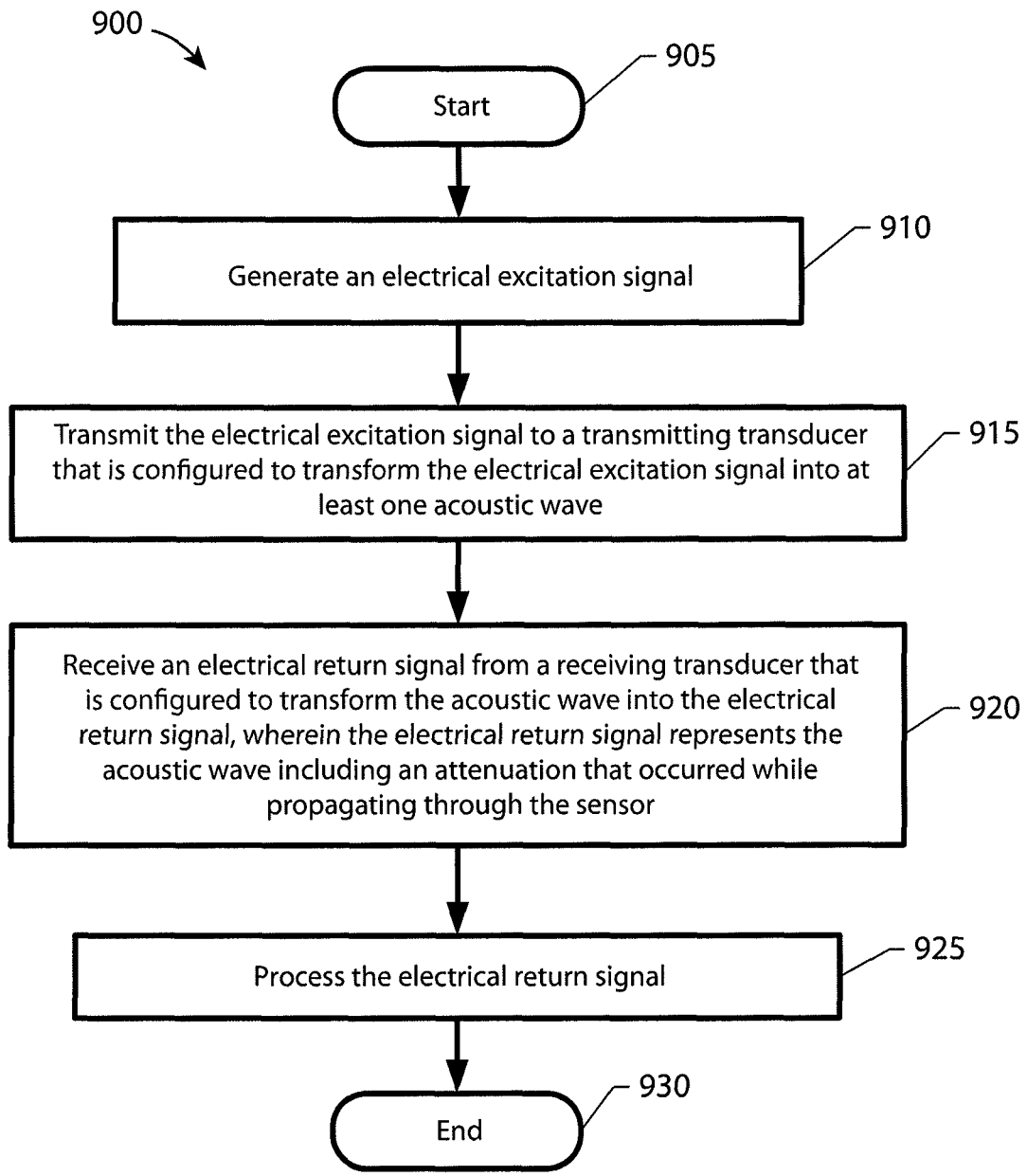
Figure 10:
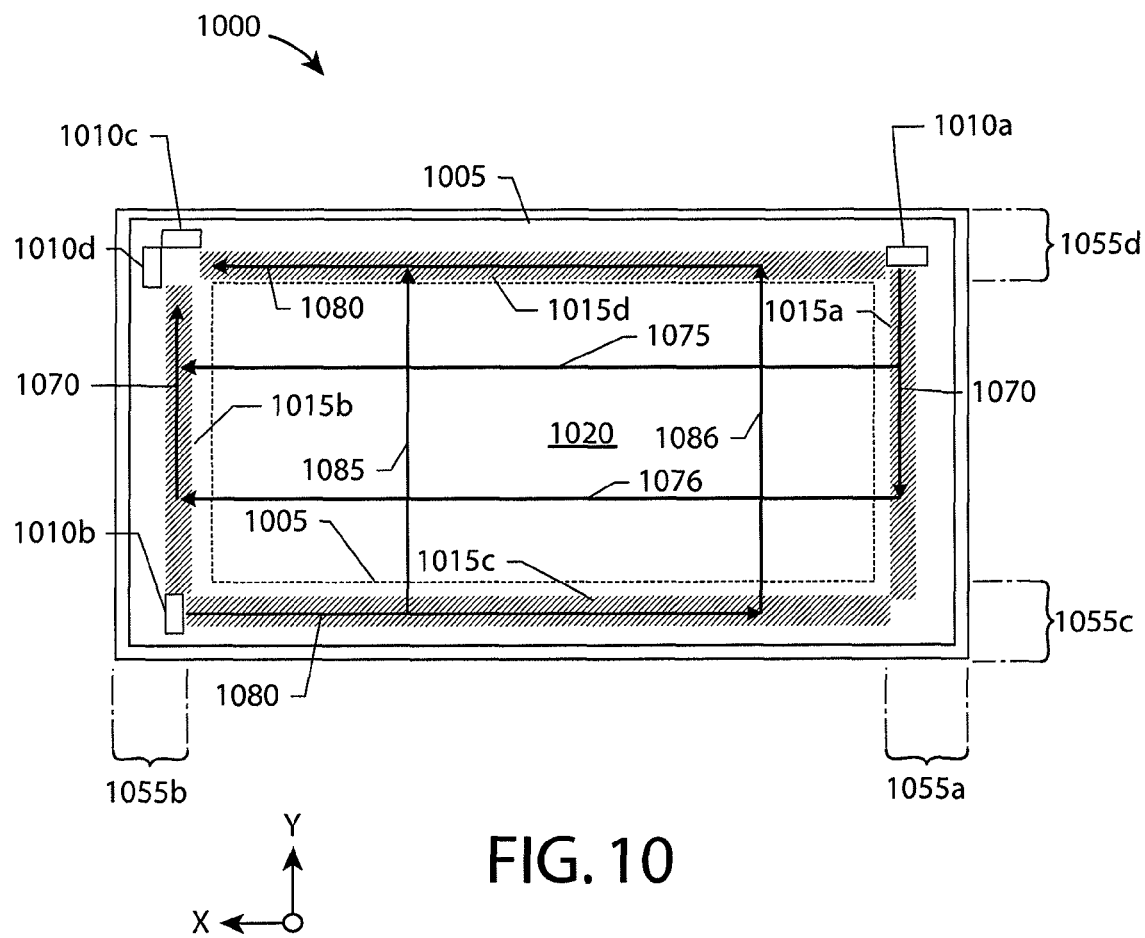
Figure 11:
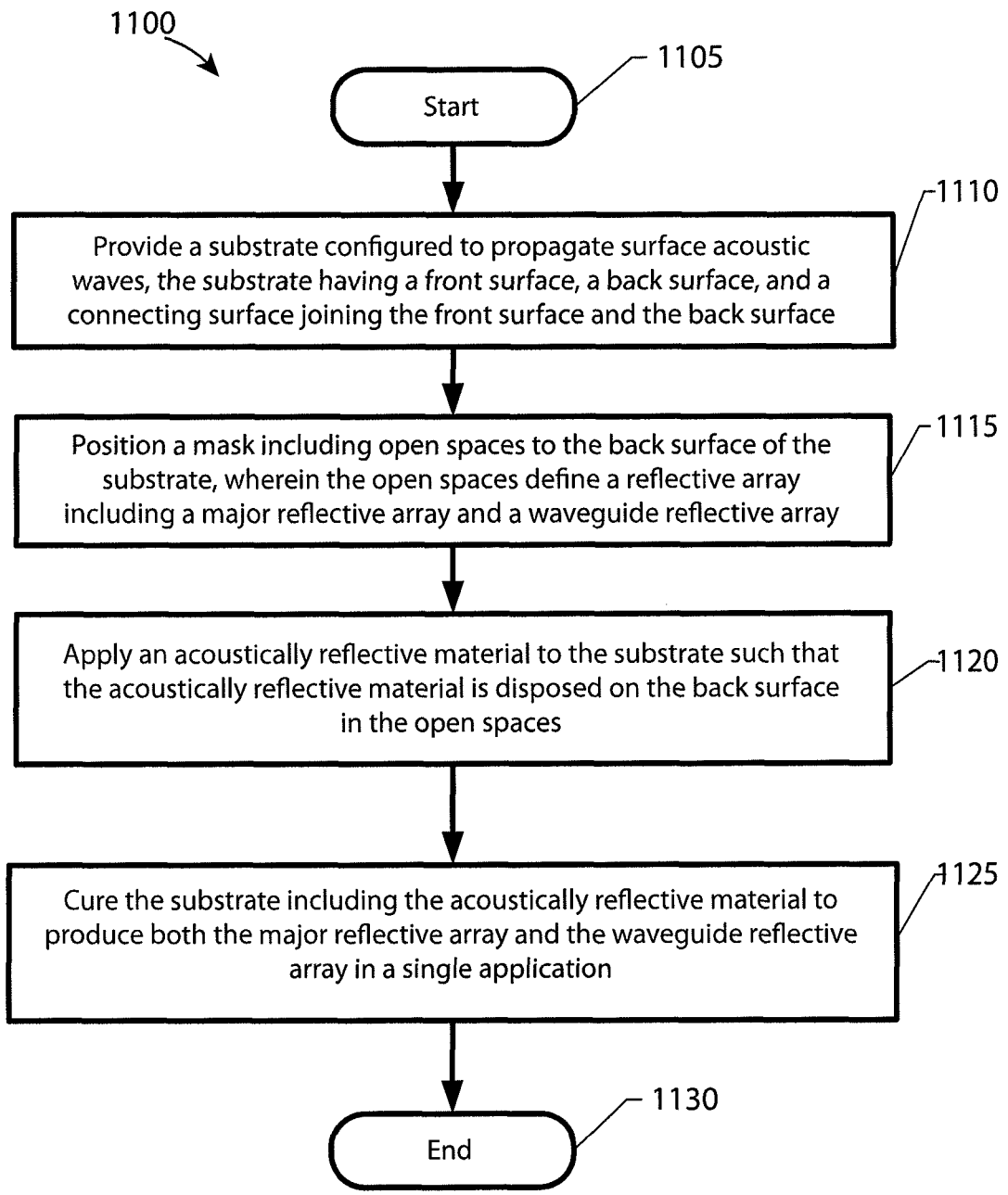

Having thus described the invention in general terms, reference will now be made to the accompanying drawings, which are not necessarily drawn to scale, and wherein:

FIG. 1 shows an example of a simplified cross-sectional view of a touch sensor, configured in accordance with some embodiments;

FIGS. 2a and 2b, respectively, show front (e.g., touch surface) and back (array surface) views of an example substrate of a touch sensor, configured in accordance with some embodiments;

FIG. 2c shows example transducers, configured in accordance with some embodiments;

FIG. 2d shows an example transducer and reflective array, configured in accordance with some embodiments;

FIG. 2e shows an example transducer and reflective array, configured in accordance with some embodiments;

FIGS. 3a, 3b, 3c and 3d show partial magnified views of a reflective array, configured in accordance with some embodiments;

FIG. 4a shows an example schematic graph of acoustic energy distribution for a surface acoustic wave propagating along a reflective array that does not include a waveguide reflective array, in accordance with some embodiments;

FIG. 4b shows an example schematic graph of acoustic energy distribution for a surface acoustic wave propagating along a reflective array that includes a waveguide reflective array, in accordance with some embodiments;

FIG. 4c shows an example schematic graph of acoustic energy distribution for a surface acoustic wave propagating along a reflective array that includes a narrow major reflective array and a waveguide reflective array, in accordance with some embodiments;

FIG. 5a shows an example reflective array that includes major reflective array and waveguide reflective array, configured in accordance with some embodiments;

FIG. 5b shows an example schematic graph of acoustic energy distribution for a surface acoustic wave propagating along a reflective array that includes a major reflective array and a waveguide reflective array, in accordance with some embodiments;

FIG. 6a shows an example reflective array including focusing-shaped reflector elements, configured in accordance with some embodiments;

FIG. 6b shows an example reflective array including focusing-shaped reflector elements, configured in accordance with some embodiments;

FIGS. 7a and 7b show simplified cross-sectional views of a touch sensor device, configured in accordance with some embodiments;

FIG. 8 shows an example control system for a touch sensor device, configured in accordance with some embodiments;

FIG. 9 shows an example of a method for determining coordinate of a touch on a sensor, performed in accordance with some embodiments;

FIG. 10 shows a front view of an example substrate of a touch sensor, configured in accordance with some embodiments; and FIG. 11 shows an example of a method for manufacturing an acoustic touch product, performed in accordance with some embodiments.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In some embodiments, a touch sensor apparatus may be implemented as a touch screen or other type of touch device, such as a touch computer, touch display, signage, or mobile touch device. The touch apparatus may include a touch sensor and an acoustic wave transducer having a piezoelectric element configured to produce a "surface acoustic wave," which is used herein to mean a Rayleigh-type wave, Love-type wave, or other surface bound acoustic wave that may be attenuated by an object placed in its path.

Rayleigh waves maintain a useful power density at the touch surface because they are bound to the touch surface. A Rayleigh wave has vertical and transverse wave components with substrate particles moving along an elliptical path in a vertical plane including the axis of wave propagation, and wave energy decreasing with increasing depth in the substrate. Both shear and pressure/tension stresses are associated with Rayleigh waves. Mathematically, Rayleigh waves exist only in semi-infinite media. In realizable substrates of finite thickness, the resulting wave may be more precisely termed a quasi-Rayleigh wave. Here, it is understood that Rayleigh waves exist only in theory, and, therefore, a reference thereto indicates a quasi-Rayleigh wave. For engineering purposes, it is sufficient for the substrate to be 3 or 4 Rayleigh wavelengths in thickness to support Rayleigh wave propagation over distances of interest to touch sensor design.

Like Rayleigh waves, Love waves are "surface-bound waves" that are guided by one surface of the substrate provided that the substrate is sufficiently thick. In contrast to Rayleigh waves, particle motion for Love waves is horizontal, in that they are parallel to the touch surface and perpendicular to the direction of propagation. Shear stress is primarily associated with a Love wave.

For purposes of this description, acoustic touch sensors using Rayleigh-type waves are discussed according to some example embodiments. However, it is recognized that other types of surface acoustic waves, including Love waves, may be used in accordance with some embodiments.

FIG. 1 shows a simplified cross-sectional view of example touch sensor 100, configured in accordance with some embodiments, but where the thickness (e.g., the height) is exaggerated relative to the length shown. Touch sensor 100 may include substrate 105, acoustic wave transducers 110 (including transducers 110a, 110b, 110c, and 110d discussed below) and reflective arrays 115 (including reflective arrays 115a, 115b, 115c, and 115d discussed below). The substrate of touch sensor 100 is shown as having front surface 120, back surface 125, and connecting surface 130.

Touch sensor 100 may be configured to make use of the fact that surface acoustic waves may propagate around glass or other type of edges, namely connecting surfaces 130, when connecting surfaces 130 are at least relatively smoothly rounded to radii that are at least as large as the surface acoustic waves' wavelength(s). In this case, placing the transmit and receive reflective arrays 115 and transducers 110 on the back of touch sensor 100, e.g., back surface 125 (instead of front surface 120), may be leveraged to create a "bezel-free" or "bezelless" touchscreen. As such, connecting surface 130 may be curved or otherwise configured as described in commonly-assigned and co-pending U.S. Patent Application Publication No. 2011/0234545 to Tanaka, et al. for "Bezel-less Acoustic Touch Apparatus," filed Jan. 24, 2011, which is incorporated by reference in its entirety herein and for all purposes.

FIGS. 2a and 2b, respectively, show front and back views of touch sensor 100, configured in accordance with some embodiments. More specifically, FIG. 2a shows a plan view of front surface 120 of touch sensor 100, and FIG. 2b shows a plan view of back surface 125 of touch sensor 100. Transducers 110 are shown in FIG. 2a as dotted lines to provide a frame of reference in relation to FIG. 2b, where transducers 110 are shown in solid lines. To provide a further frame of reference, X-Y coordinate axes are shown in FIGS. 2a and 2b.

Front surface 120 may include touch-sensitive region 205 on which an object 136 may create a contact event to provide input according to a user interface shown on a display (not shown in FIG. 1) disposed behind back surface 125. Object 136 is shown in FIG. 1a as a finger, but touch events that may be sensed by the touch sensor system may include, e.g., a stylus pressing against front surface 120 directly or indirectly through a cover sheet, an anti-reflective coating, and/or any other suitable material.

Touch sensitive region 205 may be defined as an inner portion of front surface 120 that is considered the active touch region. Touch sensitive region 205 is shown within dotted lines in FIG. 2a that define left side 205a, right side 205b, bottom side 205c, and top side 205d of touch sensitive region 205 (hereinafter referred to as only, "left side 205a," "right side 205b," "bottom side 205c" and "top side 205d," respectively).

In some embodiments, one or more front surface border regions 135 (e.g., left border region 135a, right border region 135b, bottom border region 135c and top border region 135d) may be defined as portions of front surface 120 along the outer edges and outside of touch sensitive region 205. As shown in FIG. 2a, left border region 135a may be defined as having a width between front surface left edge 150a and left side 205a along the X-axis and a length between front surface bottom edge 150c and front surface top edge 150d along the Y-axis. Right border region 135b may be defined as having a width between right side 205b and front surface right edge 150b along the X-axis and a length between front surface bottom edge 150c and front surface top edge 150d along the Y-axis. Bottom border region 135c may be defined as having a length between front surface left edge 150a and front surface right edge 150b along the X-axis and a width between front surface bottom edge 150c and bottom side 205c along the Y-axis. Top border region 135d may be defined as having a length between front surface left edge 150a and front surface right edge 150d along the X-axis and a width between top side 205d and front surface top edge 150c along the Y-axis. For clarity of presentation, the widths of the border regions 135 as shown in FIGS. 2a and 2b are not drawn to scale, but rather exaggerated.

In some embodiments, one or more back surface border regions (e.g., left border region 145a, right border region 145b, bottom border region 145c and top border region 145d, where "left" and "right" are defined with respect to front surface 120) may be defined as portions of back surface 125, as shown in FIG. 2b. Touch sensitive region 205 (including left side 205a, right side 205b, bottom side 205c, and top side 205d) is shown in FIG. 2b to provide reference points for corresponding locations on back surface 125. Touch sensitive region 205 is at front surface 120, as discussed above. As shown in FIG. 2b, left border region 145a may be defined as having a width between back surface left edge 160a and left side 205a along the X-axis and a length between back surface bottom edge 160c and back surface top edge 160d along the Y-axis. Right border region 145b may be defined as having a width between right side 205b and back surface right edge 160b along the X-axis and a length between back surface bottom edge 160c and back surface top edge 160d along the Y-axis. Bottom border region 145c may be defined as having a length between back surface left edge 160a and back surface right edge 160b along the X-axis and a width between back surface bottom edge 160c and bottom side 205c along the Y-axis. Top border region 145d may be defined as having a length between back surface left edge 160a and back surface right edge 160b along the X-axis and a width between top side 205c and back surface top edge 160c along the Y-axis.

In some embodiments, touch sensor 100 may include an opaque portion, a transparent portion, and/or a partially transparent (e.g., "clouded") portion. When at least one transparent portion and/or substantially transparent portion is included, that portion may be positioned in front of a display device, such that a user viewing front surface 120 may be able to see the display device and its display content through at least a portion of substrate 105, such as touch sensitive region 205. In this regard, touch sensor 100 may be coupled to a control system having a number of functions, including the coordinating of touch functionality with the presentation of displays, some examples of which are discussed below with reference to FIG. 9.

Substrate 105 may also be configured to serve as a propagation medium having one or more surfaces on which surface acoustic waves propagate. For example, substrate 105 may be transparent and isotropic. As such, substrate 105 may comprise any suitable glass (e.g., soda lime glass; boron-containing glass, e.g., borosilicate glass; barium-, strontium-, zirconium- or lead-containing glass; crown glass), and/or other suitable material(s). For example, any glass having a relatively low loss of surface acoustic wave propagation, thereby resulting in better signals, may be preferred according to some embodiments.

One or more acoustic wave transducers 110 may be positioned on, or otherwise coupled to, back surface 125 of substrate 105 at the border regions (e.g., left border region 145a, right border region 145b, bottom border region 145c and top border region 145d). Various types of transducers may be used in accordance with some embodiments. As referred to herein, a "transducer" includes a physical element or set of elements that transforms energy from one form to another, such as between electrical energy and acoustic energy. For example, transducers 110 may include one or more piezoelectric elements that function as acoustically emissive and/or sensitive structures. As such, any machine that utilizes a transducer discussed herein is configured to transform energy from one form to another.

Transducers 110 may be disposed on back surface 125 for transmitting and/or receiving surface acoustic waves. A "transmitting transducer," as used herein, refers to at least one of transducers 110 that is configured to transform electrical energy into acoustic energy. For example, a transmitting transducer may include one or more electrodes, such as two electrodes, that are coupled to a controller. The controller may be configured to generate one or more electrical signals, such as pseudo sinusoidal wave tone bursts at one or more desired frequencies. These electrical signals, which are generated by the controller and provided to the transmitting transducer, are sometimes referred to herein as "excitation signals." The excitations signals may be applied to the electrodes of the transmitting transducer to cause the piezoelectric element therein to vibrate, thereby transforming electrical signals into physical waves having one or more controllable and configurable characteristics (e.g., predetermined resonant frequency, wavelength, etc.).

In some embodiments, the transmitting transducer may further include a wedge shaped coupling block between the piezoelectric element and substrate 105. Vibration of the piezoelectric element may generate bulk waves in the coupling block which in turn couple to the substrate as surface acoustic waves.

A "receiving transducer," as used herein, refers to at least one of transducers 110 that is configured to transform acoustic energy into electrical energy. A receiving transducer may include, for example, electrodes coupled to the controller, a piezoelectric element, a wedge shaped coupling block, and/or any other suitable component(s). As such, surface acoustic waves traveling through the substrate may cause vibrations in the piezoelectric element (e.g., via the coupling block), which in turn causes an oscillation voltage to appear on the electrodes.

At the receiving transducer, the oscillation voltage on the electrodes may include amplitudes that correspond with amplitudes of return surface acoustic waves received at the receiving transducer. Thus, when perturbations, such as those caused by a touch event, attenuate surface acoustic waves propagating on the substrate between a transmitting transducer and receiving transducer, the attenuation also appears at the electrodes of the receiving transducer in the form of voltage attenuation included in the return electrical signal generated by the receiving transducer and provided to a controller.

One or more reflective arrays 115 may be placed on back surface 125 of substrate 105 within border regions 145. Surface acoustic waves may be propagated in a prevailing direction along reflective arrays 115. Reflective arrays 115 may include a plurality of reflector elements (including major reflector elements and waveguide reflector elements, such as those discussed in the examples herein with respect to, e.g., FIGS. 3a-6b. One or more of the reflector elements may be configured to purposefully function as inefficient reflectors that may, for example: (1) allow a substantial portion of a surface acoustic wave to pass un-scattered as the wave propagates along the reflective array, and/or (2) cause the scattering of a relatively small portion of the surface acoustic wave. For example, an inefficient reflector element may be designed to reflect less than 1%, 1% to 1.5%, 1.5% to 2%, more than 2%, or any suitable amount (including any suitable range of amounts) of the incident surface acoustic wave energy that arrives at the reflector element. Thus, as a surface acoustic wave propagates along the reflective array, some or all of the reflector elements may each scatter (or "reflect" or "direct") some energy of the surface acoustic wave (the reflected energy is sometimes referred to herein as a "ray" or "redirected" wave), and allow at least some of the energy to pass to the adjacent reflector element in the array. Similarly, the adjacent and/or other subsequent reflector element(s) may reflect some of the acoustic wave's energy and allow at least some of the energy to pass to other reflector elements in the reflective array. In this regard, the surface acoustic wave's energy may be reflected and passed until it dissipates completely and/or arrives at the last reflector element defining the end of the reflective array.

Reflector elements may scatter portions of a surface acoustic wave in controlled directions as a function of the reflector angle of the reflector elements. Thus a reflective array may direct scattered components of a surface acoustic wave generated by a transmitting transducer from back surface 125, across connecting surface 130, and across front surface 120 in the X-axis direction, the Y-axis direction, and/or any other suitable direction(s). A reflective array may also or instead be configured to collect scattered components of a surface acoustic wave that are propagating from front surface 120 (for example, in the direction of the X-axis or Y-axis), across connecting surface 130, and towards a receiving transducer on back surface 125.

Reflective arrays 115 may be formed in any suitable manner. For example, reflective arrays 115 may be manufactured by printing, etching, stamping a metal substrate, and/or shaping a mold for a polymer substrate. As another example, reflective arrays 115 may be formed of a glass frit that is silk-screened onto a glass sheet and/or other substrate material, such as formed by a float process, and cured in an oven to form a chevron, diamond, and/or other suitable non-chevron pattern of raised glass interruptions, which may thereby function as the reflector elements discussed above. Example methods of manufacturing products having reflective arrays are discussed further in connection with FIG. 11. As such, the reflector elements may be configured to have heights and/or depths on the order of, for example, 1% of the acoustic wavelength and, therefore, only partially couple and reflect the acoustic wave's energy as discussed above. Because touch sensor 100 may be configured to be positioned in front of a display device, and because reflective arrays 115 are generally optically visible, reflective arrays 115 may be positioned at the periphery of front surface 120 of substrate 105 at border regions 135, outside of touch sensitive region 205, where the reflective arrays 115 may be hidden and protected under a bezel. In some embodiments, reflective arrays 115 may be formed on back surface 125 of substrate 105 at border regions 145. As shown in FIGS. 7a and 7b, front surface 120 of substrate 105 does not need any protective bezel over its periphery, but nevertheless may optionally have a protective bezel.

In some embodiments, touch sensor 100 may include at least two pairs of transducers and reflective arrays, where each pair of transducers and reflective arrays is associated with a sensing axis. For example, the two sensing axes may be orthogonal with respect to each other to form an X-Y coordinate input system. With reference to FIGS. 2a and 2b, two pairs of transducers 110 and reflective arrays 115, positioned on back surface 125 of substrate 105 at border regions 145, may be associated respectively with the X and Y sensing axes. As shown, transmitting transducer 110a, transmitting reflective array 115a, receiving reflective array 115b, and receiving transducer 110c may be used for determining a Y-coordinate along the Y-axis for a touch event. Similarly, transmitting transducer 110b, transmitting reflective array 115c, receiving reflective array 115d, and receiving transducer 110d may be used for determining an X-coordinate along the X-axis for the touch event.

In some embodiments, such as when touch sensor 100 is configured to provide two orthogonal axes, the two transducer pairs (and transducers 110a, 110c and transducers 110b, 110d) may be disposed at a right angle with respect to each other to define the two sensing axes. Thus, for determining Y-axis coordinates, transmitting transducer 110a may be placed in a Y-axis transmitting area and receiving transducer 110c may be placed in a Y-axis receiving area that is opposite the Y-axis transmitting area along the X-axis. Similarly, for determining X-axis coordinates, transmitting transducer 110b may be placed in an X-axis transmitting area and receiving transducer 110d may be placed in an X-axis receiving area that is opposite the X-axis transmitting area along the Y-axis.

For example and with reference to FIG. 2b, transmitting transducer 110a may be placed at the top left corner defined by back surface top edge 160d and back surface left edge 160a while receiving transducer 110c may be placed on the top right corner defined by back surface top edge 160d and back surface right edge 160b. Transmitting transducer 110b may be placed on the bottom right corner defined by back surface bottom edge 160c and back surface right edge 160b while receiving transducer 110d may be placed on the top right corner defined by back surface top edge 160d and back surface right edge 160b. In the example shown, the two transducer pairs are disposed at a right angle, relative to each other, at the top right corner that is defined by surface top edge 160d and back surface right edge 160b.

In some embodiments (not shown), the two transducer pairs may be disposed at a right angle at other corners of substrate 105 to define a coordinate system. Additionally or alternatively, transducers 110 may be configured to transmit and/or receive acoustic waves symmetrically. Thus, the location of a receiving transducer and/or transmitting transducer in a pair (e.g., transducers 110a, 110c or transducers 110b, 110d) may be switched. As another example, one or more of transducers 110 may be configured to function as "transceivers" configured to both transmit and receive surface acoustic waves and perform transformations thereof from/to electrical signals, for example if transducer 110a functions as a transceiver, transducer 110c may be eliminated and reflector array 115b replaced by a structure that back reflects surface acoustic waves by 180 degrees.

Touch sensor 100 may also include a pair of Y-axis reflective arrays 115a and 115b and a pair of X-axis reflective arrays 115c and 115d. As shown in FIG. 2b, reflective arrays 115a and 115c may be configured to act as acoustic wave dispersers, thereby scattering and dissipating surface acoustic waves sent from a transmitting transducer across at least a portion of front surface 120, such as touch sensitive region 205. Reflective arrays 115b and 115d may act as acoustic wave collectors, collecting the scattered surface acoustic waves and directing them to receiving transducers 110c and 110d, respectively.

As shown in FIGS. 2a and 2b, transmitting transducer 110a may be configured to generate and transmit Y-coordinate surface acoustic waves (i.e., surface acoustic waves traveling along the X-axis on front surface 120 of substrate 105 used for determining Y-axis coordinates of a touch event), such as surface acoustic wave 170, in a prevailing direction along reflective array 115a positioned along border region 145a of back surface 125. Surface acoustic wave 170 may be scattered along the X-axis across front surface 120 of substrate 105 and be used to determine Y-axis coordinate(s) of a touch event. Reflector elements of reflective array 115a may scatter surface acoustic wave 170 as the wave travels from the beginning to the end of reflective array 115a. The scattered components, or rays, of surface acoustic wave 170 may ripple outwardly toward back surface left edge 160a, around connecting surface 130 and toward front surface left edge 150a. As such, each ray (such as ray 175 and ray 176) of the scattered surface acoustic wave 170 may move generally in the positive X-axis direction (i.e., perpendicular to the sensing Y-axis) as small portions of the wave's energy (e.g., 1% at a time) across front surface 120 toward font surface right edge 150b, travel around connecting surface 130, and toward back surface right edge 160b, where the rays are merged as a return acoustic wave by reflective array 115b positioned along border region 145b on back surface 125. Upon traveling to back surface 125, reflector elements of reflective array 115b may direct the scattered, returned surface acoustic wave 170 along reflective array 115b to receiving transducer 110c. Although lines are used in the drawings to represent the prevailing direction of the movement of acoustic waves and rays of acoustic waves, it is understood by those skilled in the art that waves do not always travel as narrow lines and that the use of lines in the drawings is meant to represent the movement of the center of the waveform's travel path while avoiding unnecessarily over complicating the drawings.

Similar to the discussion above regarding Y-coordinate surface acoustic waves, transmitting transducer 110b may be configured to generate and transmit X-coordinate surface acoustic waves (i.e., surface acoustic waves traveling along the Y-axis on front surface 120 of substrate 105 used for determining X-axis coordinates of a touch event), such as surface acoustic wave 180, in a prevailing direction along reflective array 115c positioned along border region 145c of back surface 125. Reflector elements of reflective array 115c may scatter surface acoustic wave 180 as rays (such as rays 185 and 186) while the wave travels from the beginning to the end of reflective array 115c. Each of the surface acoustic wave rays of surface acoustic wave 180 may ripple toward back surface bottom edge 160c, around connecting surface 130 and toward front surface bottom edge 150c. As such, a number of rays, each having a small portion of the energy (e.g., 1% of the energy) of surface acoustic wave 180 may move generally in the positive Y-axis direction (i.e., perpendicular to the sensing X-axis) across front surface 120 toward front surface top edge 150d, around connecting surface 130, and toward back surface top edge 160d to reflective array 115d positioned along border region 145d on back surface 125. Upon traveling to back surface 125, reflector elements of reflective array 115d may direct the scattered surface acoustic wave 180 along reflective array 115d to receiving transducer 110d.

In some embodiments, it may be desirable to decrease the widths of border regions 135 and/or border regions 145. Smaller border region widths may allow a greater percentage of front surface 120 to be allocated to touch sensitive region 205. As such, substrate 105 may have smaller dimensions that allow touch sensor 100 to fit into smaller devices without requiring corresponding reductions to touch screen size. In another example, the dimensions of substrate 105 may be kept the same or increased without a corresponding increase in border region width. Furthermore, a touch screen having narrower border regions may convey the impression of a less cumbersome, sleek design, making the product more aesthetically pleasing or otherwise attractive to some customers.

In some embodiments, reducing the width of the border regions may be accomplished by reducing the beam width of surface acoustic waves propagating in the border regions. The beam width of a surface acoustic wave may be defined as a width within which surface acoustic wave energy contributes to reflective array function. In other words, as a surface acoustic wave propagates along a reflective array in an associated border region, the beam width (or maximum beam width) of the surface acoustic wave may define a minimum width requirement of the associated border region. If the border region is narrower than the beam width, portions of the surface acoustic wave energy that would otherwise contribute to reflective array function may not reach a receiving transducer, which may result in unsuitably low signal amplitudes at the receiving transducer.

However, surface acoustic waves, like many other types of waves, tend to angularly spread if collimated, emitted and/or scattered with a small aperture. As such, the beam width of a surface acoustic wave propagating along a reflective array may tend to increase as the surface acoustic wave propagates further from a transmitting transducer. Accordingly, the border region width, having a minimum value as defined by the beam width, may need to be increased in some embodiments to support larger sized touch sensors having increased border region length.

A relationship between beam width, and thus border region width, and transmitting transducer size is shown in FIG. 2c, in accordance with some embodiments. As shown, transmitting transducer 220a has a width, "W1," which may be wider and thus have a larger aperture, than transmitting transducer 220b having width "W2". As a result of the different aperture sizes, surface acoustic wave 225a propagating outwards from transmitting transducer 220a has a smaller angular divergence than surface acoustic wave 225b propagating outwards from transmitting transducer 220b. Therefore, despite surface acoustic wave 225b having a smaller near-transducer beam width, e.g. at distance 230, than surface acoustic wave 225a, surface acoustic wave 225b may have a larger far-transducer beam width than surface acoustic wave 225a, e.g., at distance 235.

As discussed above, the minimum border region width may be defined by the maximum beam width of a surface acoustic wave propagating along the border region. As a result of angular divergence, however, decreasing maximum beam width (e.g., at regions further from the transmitting transducer) may be more complicated than reducing transducer width.

As shown in FIG. 2d, an optimal width for transmitting transducer 240 to minimize the beam width at the end of a reflective array 245 having a length L may be given by:

$$\text{Transducer Width} = \sqrt{(\lambda * L)}, \quad \text{Equation 1}$$

where λ is the wavelength of surface acoustic waves. Equation 1 is a mathematical approximation derived without accounting for any waveguide effects of reflective array 245. The wavelength of surface acoustic waves may refer to a wavelength that an ideal transducer may be configured to generate and transmit through the substrate. Real, physical transducers may not be so perfect, thus it is appreciated that "wavelength," as used herein, may refer to a dominant wavelength of surface acoustic waves generated and transmitted by a transducer (e.g., transmitting transducers 110a and 110b shown in FIG. 2b).

Also shown in FIG. 2d, transmitting transducer 240 is configured to send surface acoustic wave 250 along reflective array 245. At zone 255 of reflective array 245 closest to transmitting transducer 240, beam width 260 of surface acoustic wave 250 may be substantially equal to the width of transmitting transducer 240. In order to couple sufficient amounts of the acoustic signal, reflective array 245 may have a width dimension 265 that is substantially the same as the transducer width given by Equation 1.

It is appreciated, however, that the width dimension of a reflective array may not be equal to transducer width in some embodiments. For example, a focusing transducer may be used as discussed in commonly-assigned U.S. Pat. No. 6,636,201 to Gomes et al., titled "Acoustic Touchscreen Having Waveguided Reflector Arrays," which is incorporated by reference in its entirety herein and for all purposes.

At zone 270 of reflective array 245 furthest from transmitting transducer 240, beam width 260 has increased as a result of angular divergence. Here, beam width 260 is at its largest value and may be given by:

$$\text{Maximum Beam Width} = \sqrt{(2 * \lambda * L)}, \quad \text{Equation 2}$$

where λ is the wavelength of surface acoustic waves and L is the length of reflective array 245. Like Equation 1, Equation 2 is a mathematical approximation derived without accounting for any waveguide effects of reflective array 245. At zone 270, beam width 260 is larger than width dimension 265 of reflective array 245. In that sense, while width dimension 265 may define a visible width of reflective array 245, the minimum border region width is greater than width dimension 265 to support beam width 260. The portions of the border region in which beam width 260 falls outside of width dimension 265 may be analogized to a road shoulder. When designing a road or highway, it is not sufficient to consider only the width of the road's asphalt (i.e., width dimension 265). Sufficient real estate must be allotted to provide room for the road's shoulder as well. It is the combined width of the road's asphalt and shoulders (i.e., beam width 260 at zone 270) that determines the width of the real estate needed for the road. Likewise, in the design of a touch sensor border region, such as front surface border regions 135 and back surface border regions 145 as shown in FIGS. 2a and 2b respectively, the border region width must be sufficiently wide to account for the beam width. As such, the maximum beam width may place a limitation upon the minimum border region width allowable without unacceptably compromising reflective array function and signal strength at the receiving transducers.

FIG. 2e shows an example beam width 275 when the waveguide effects of reflective array 245 are considered. Lines 280 represents a ray of SAW energy that escapes reflective array 245 near its beginning where the reflector density and its effects of SAW velocity (as discussed in further detail below) is low and hence waveguide effects are weak. Line 285 represents a SAW ray that in a naïve analysis would leave the array, but is pulled back in due to stronger waveguide effects where the density of reflectors is greater. The "waveguide effects" considered here may also be described as "refraction effects" or "total internal reflection effects." To borrow optics terminology, the "index of refraction" is larger (that is the wave phase velocity is smaller) inside the reflective array 245 than outside. Similar to how portions of light propagating within water incident to an water/air surface at a glancing angle will tend to be internally reflected and remain in the water, internal reflection will tend to keep SAW energy within reflective array 245. Despite the maximum value of beam width 275 being less than the result given by Equation 2 (e.g., $\sqrt{(2 ** \lambda * L)}$), the beam width 275 nonetheless may place a limitation upon the minimum border region width allowable without unacceptably compromising reflective array function and signal strength at the receiving transducers.

In some embodiments, techniques for generating smaller beam widths may be desirable to enable smaller border region widths. In other words, it may be desirable for the maximum beam width as a function of reflective array length to be smaller than the result given by Equation 2 for a given wavelength λ of surface acoustic waves and length of reflective array L.

In some embodiments, one or more reflective arrays 115 may be comprised of a major reflective array and a waveguide reflective array. The waveguide reflective array may be configured to reduce the beam widths of surface acoustic waves propagating along the length of the reflective array. In particular, the waveguide reflective array may concentrate acoustic energy of the surface acoustic waves, thus reducing the beam widths of the surface acoustic waves. As will be discussed in greater detail below, when the beam widths of surface acoustic waves are reduced, the major width dimension and/or transducer width (or aperture size) may also be reduced (e.g., smaller than the result given by Equation 1). Despite such a reduction in the major width dimension of the major reflective arrays, the fraction of the surface acoustic waves intercepted by the major reflective array may be maintained, increased and/or kept sufficiently high for touch sensing purposes. Furthermore, the widths of border regions 145, wherein reflective arrays 115 are located, may also be reduced because of the reduced beam widths as discussed above.

Figure 3A:
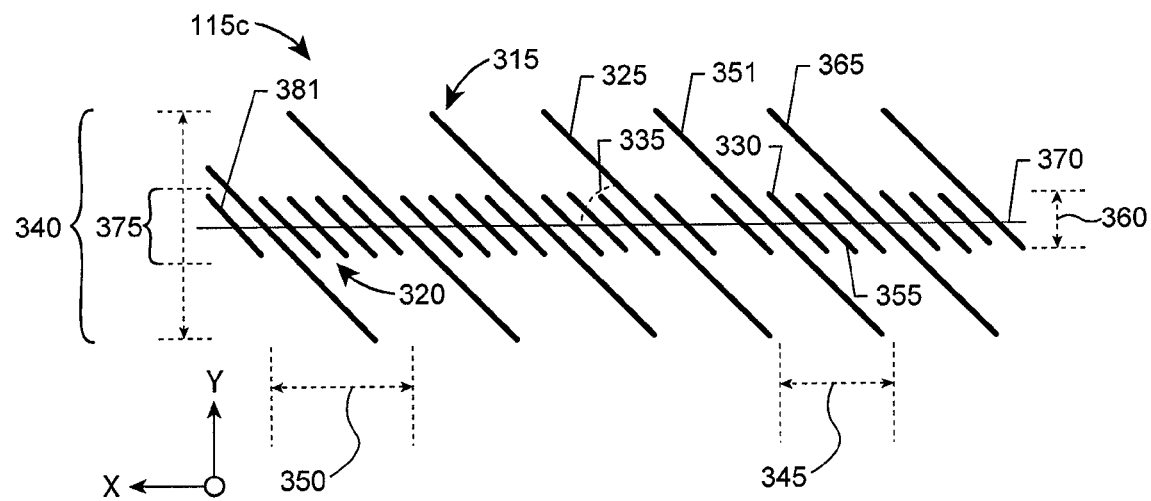

FIG. 3a shows a partial magnified view of reflective array 115c in zone 305 (as shown in FIG. 2b), configured in accordance with some embodiments. Reflective array 115c is merely an example reflective array, and the discussion herein may be applicable to other reflective arrays 115.

Reflective array 115c may include major reflective array 315 and waveguide reflective array 320. Major reflective array 315 may include a plurality of major reflector elements, such as major reflector elements 325, 351 and 365. As shown, each major reflector element may be disposed parallel to and/or otherwise not touching each other along the length dimension (running along X-axis direction) of reflective array 115c. As such, a surface acoustic wave propagating in a prevailing direction along the length of reflective array 115c (e.g., in the negative X-axis direction from transmitting transducer 110b) may have components scattered (e.g., in the negative Y-axis direction) as described above with reference to FIGS. 2a and 2b.

In some examples, the major reflector elements may form a 45° reflector angle with respect to the length dimension of reflective array 115c, as shown at 335 for major reflector element 325. However, the major reflector elements may not be parallel and may form other reflector angles in suitable embodiments, as discussed in commonly-assigned U.S. Pat. No. 5,854,450 to Kent, titled "Acoustic Condition Sensor Employing a Plurality of Mutually Non-Orthogonal Waves" and U.S. Provisional Patent Application No. 61/714,187 to Huangs, titled "Curved Profile iTouch" (disclosing curved profile touch sensors), which are incorporated by reference in their entirety herein and for all purposes.

In some embodiments, the major reflector elements may be disposed such that center-to-center spacing between neighboring major reflector elements define a distance equal to at least one positive integer multiple of the surface acoustic waves' wavelength. "Neighboring major reflector elements," as used herein, refers to two major reflector elements that are disposed adjacently, or such that there is no intervening third major reflector element within the center-to-center spacing of the two neighboring reflector elements (although there may or may not be one or more waveguide reflector elements disposed in the space between neighboring major reflector elements). The center-to-center spacing distances between two neighboring major reflector elements may be given by:

Center-to-center Spacing=$n*\lambda$,           Equation 3 where n is a positive integer and $\lambda$ is the wavelength of surface acoustic waves. Equation 3 applies to touchscreen designs in which it is desired that arrays scatter surface acoustic waves by an angle of 90°; more generally the spacing is chosen to assure coherent scattering at the desired scattering angle.

Figure 3B:
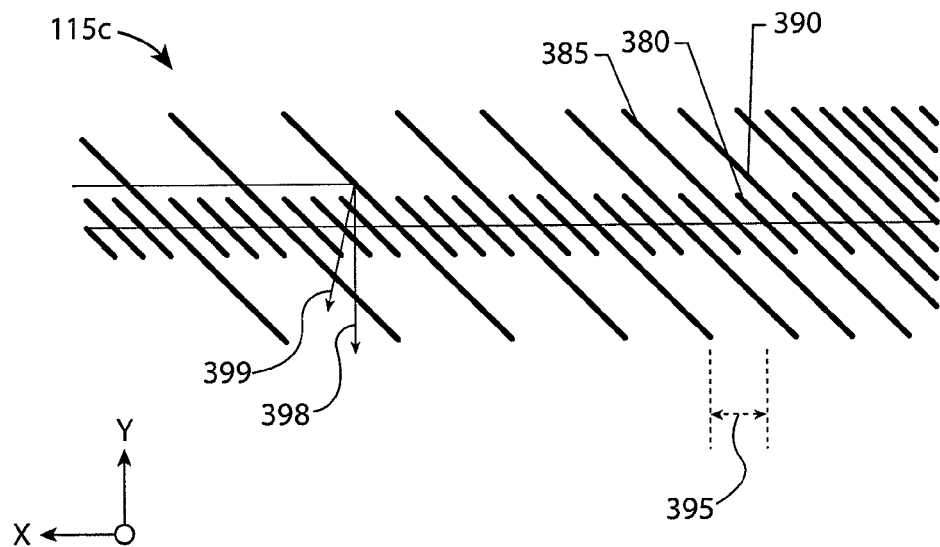

In some embodiments, the center-to-center spacing between major reflector elements define regions between the major reflector elements (e.g., region 345 defined by the center-to-center spacing of major reflector element 351 and major reflector element 365). These regions may be slightly smaller than the center-to-center spacing because of the major reflector elements having a certain thickness. The center-to-center spacing, and thus the regions, may be comparatively greater at a first portion of a reflective array closer to a transmitting transducer and smaller at a second portion of the major reflective array further from the transmitting transducer. Surface acoustic waves may have a high acoustic energy at the transmitting transducer. As the waves traverse along a reflective array, portions of its energy are scattered by each major reflector element, leaving smaller portions of acoustic energy incident on each successive major reflector element. As such, an uneven spacing of major reflector elements as described may counteract this effect, as well as the effects of wave attenuation in the substrate material, to provide a more even acoustic energy distribution in the scattered rays (e.g., rays 185 and 186). As shown in FIG. 3a, region 350 that is closer to transmitting transducer 110b (shown in FIG. 2b) corresponds with greater center-to-center spacing than region 345 that is further from transmitting transducer 110b. For example, region 350 may correspond with a center-to-center spacing of $n*\lambda$, where n is 5, while region 345 correspond with a center-to-center spacing of $n*\lambda$, where n is 4. In FIG. 3b, which shows a partial magnified view of reflective array 115c in zone 310 (as shown in FIG. 2b) that is further from transmitting transducer 110b than zone 305, the major reflector elements may have center-to-center spacings that are closer together than in zone 305. For example, region 395 between major reflector elements 385 and 390 may correspond with a center-to-center spacing of $n*\lambda$, where n is 2.

In some embodiments, the center-to-center spacing between neighboring major reflector elements may be comparatively greater at a first portion of a reflective array closer to a receiving transducer and smaller at a second portion of the major reflective array further from the receiving transducer. For example and as shown in FIG. 2b, zone 210 of reflective array 115d may have major reflector elements that are spaced further apart than major reflector elements at zone 215 because zone 210 is closer to receiving transducer 110d than zone 215.

In some embodiments, one or more major reflector elements (e.g., major reflector elements 325 and 351) of reflective array 115c may define a major width dimension 340. As discussed above, a thin major width dimension 340 may be desirable in some embodiments. As such, the beam width of a surface acoustic wave may be decreased with the addition of a waveguide reflective array, such as waveguide reflective array 320, which may allow for a decreased major width dimension 340 in some embodiments. In some embodiments, major width dimension 340 may be between 2 mm and 10 mm.

Waveguide reflective array 320 may include a plurality of waveguide reflector elements, such as waveguide reflector elements 330 and 355. In some embodiments, a waveguide reflector element may define a waveguide width dimension 360. As shown in FIG. 3a, waveguide width dimension 360 may be smaller than major width dimension 340. In some embodiments, waveguide width dimension 360 is configured to be sufficiently narrow to prevent multi-mode waveguiding by waveguide reflective array 320. For example, waveguide width dimension 360 may be between one-tenth and one-third of major width dimension 340 in some embodiments.

In some embodiments, a waveguide reflector element of waveguide reflective array 320 may have a reflector angle substantially parallel to reflector angles of an adjacent major reflector element and/or an adjacent major reflector element. For example, the waveguide reflector elements may have reflector angles that follow with the same formulaic layout or other type of arrangement of the major reflector elements. In some embodiments, each major reflector element of reflective array 115c may be disposed parallel to each other along the length dimension of reflective array 115c (e.g., at 45° with respect to the length dimension) such that a surface acoustic wave propagating in a prevailing direction along the length of reflective array 115c will have components scattered as described above with reference to FIGS. 2a and 2b. Similarly, waveguide reflector elements may be disposed parallel to the major reflector elements to prevent blind spots across the touch region caused by large center-to-center spacings (i.e., where n is large in Equation 3) between major reflector elements. As such, the waveguide reflector elements may further help increase linearity, smooth the acoustic signal at receiving transducer 110c, and reduce interference effects caused by spurious waves scattered by major reflective array 315.

As discussed above, the surface acoustic waves that generated by transducers and scattered by the reflector elements have prevailing directions, which represents the center of the waveform's travel path. In actuality, however, not all surface acoustic waves travel in the prevailing directions. Surface acoustic waves that do not propagate in the prevailing directions become so-called "spurious waves." If these spurious waves reach the receiving transducers, they may result in noise and may throw off proper judgment by the controller. Thus, another advantage of the waveguide reflector elements is that they attenuate spurious waves scattered by the major reflective array as the spurious waves pass through the waveguide reflector elements, such as spurious wave 399 shown in FIG. 3b that is reflected in a direction different from the prevailing direction shown by ray 398.

One or more waveguide reflector element may be disposed between two of the major reflector elements. For example, waveguide reflector element 330 may be disposed between major reflector element 351 and major reflector element 365. Similarly, waveguide reflector element 355 may also disposed between major reflector element 351 and major reflector element 365. In some embodiments, each waveguide reflector element may be disposed between two neighboring major reflector elements. However, not all waveguide reflector elements must necessarily be disposed between two major reflector elements. For example, one or more of waveguide reflector elements may also be disposed at the beginning or end of a reflective array, such as waveguide reflector element 381 disposed at the beginning of reflective array 115c as shown in FIG. 3a.

In some embodiments, waveguide reflector elements may be disposed within regions formed between the center-to-center spacing of neighboring major reflector elements such that the waveguide reflector element forms an interval with an adjacent major reflector element and/or an adjacent waveguide reflector element that is equal to at least one positive integer multiple of the surface acoustic waves' wavelength. In other words, the center-to-center interval between a waveguide reflector element and any other reflector element may be given by:

$$\text{Center-to-center Interval} = n^*\lambda, \quad \text{Equation 4}$$

where n is a positive integer and $\lambda$ is the wavelength of surface acoustic waves. In some examples, as shown in FIGS. 3a and 3b, n is equal to 1 for each waveguide reflector element, such that waveguide reflector elements fill in at regions formed between two major reflector elements greater than $\lambda$ (i.e., where n is 2 or greater in Equation 3). While Equation 4 has a similar form as Equation 3, the numerical values of "n" may be different. For example, waveguide reflector element 330 is disposed at an interval $\lambda$ (e.g., n=1 in Equation 4) away from major reflector element 351 and an interval $\lambda$ away from waveguide reflector element 355. Similarly, waveguide reflector element 380 is disposed at an interval $\lambda$ away from major reflector element 385 and an interval $\lambda$ away from major reflector element 390. It is appreciated that n may vary for each waveguide reflector element in Equation 4. As such, one or more waveguide reflector elements may be omitted, as shown between major reflector elements 325 and 351 in FIG. 3a.

While Equation 3 and Equation 4 give spacing equations that are positive integer multiples of $\lambda$, the spacing may be different in some embodiments, particularly if the reflective array is configured to scatter surface acoustic waves by an angle different from 90°. In general, the spacing may be integer multiples of a spacing quantum chosen to support coherent scattering by the desired angle, such as discussed in U.S. Provisional Patent Application No. 61/714,187 incorporated by reference above.

In some embodiments, the waveguide reflector elements of waveguide reflective array 320 may be disposed such that they define waveguide centerline 370, as shown in FIG. 3a. Waveguide centerline 370 may be defined as a line running perpendicular to waveguide width dimension 360 at the center of waveguide dimension 360. Waveguide reflective array 320 may be positioned relative to major reflective array 315 such that waveguide centerline 370 is within a center third 375 of major width dimension 340. In some embodiments, as shown in FIGS. 3a, 3b, 3c, 3d, 4b and 4c, waveguide centerline 370 is within the middle of major width dimension 340. The waveguide centerline 370 may also be offset from the middle of major width 340, as shown in FIGS. 5a and 5b for waveguide centerline 570 and major width dimension 540.

As discussed above, waveguide reflective array 320 may be configured to concentrate the energy of surface acoustic wave 180 as the wave propagates along reflective array 115c. Conceptually, reflective array 115c may behave similar to an optical waveguide that includes a core material surrounded by cladding material, with the guided wave having a slower propagation speed (e.g., higher index of refraction) in the core region than the cladding region. As surface acoustic wave 180 propagates along reflective array 115, its propagation speed is slowed by each reflector element. Thus, waveguide reflective array 320 (having a dense spacing of waveguide reflector elements) may function as a core region that is surrounded by major reflective array 315 (having a less dense spacing of major reflector elements), which may function as a cladding region. As a result of the varying propagation speeds, the beam width of surface acoustic wave 180 may be decreased.

Figure 3C:
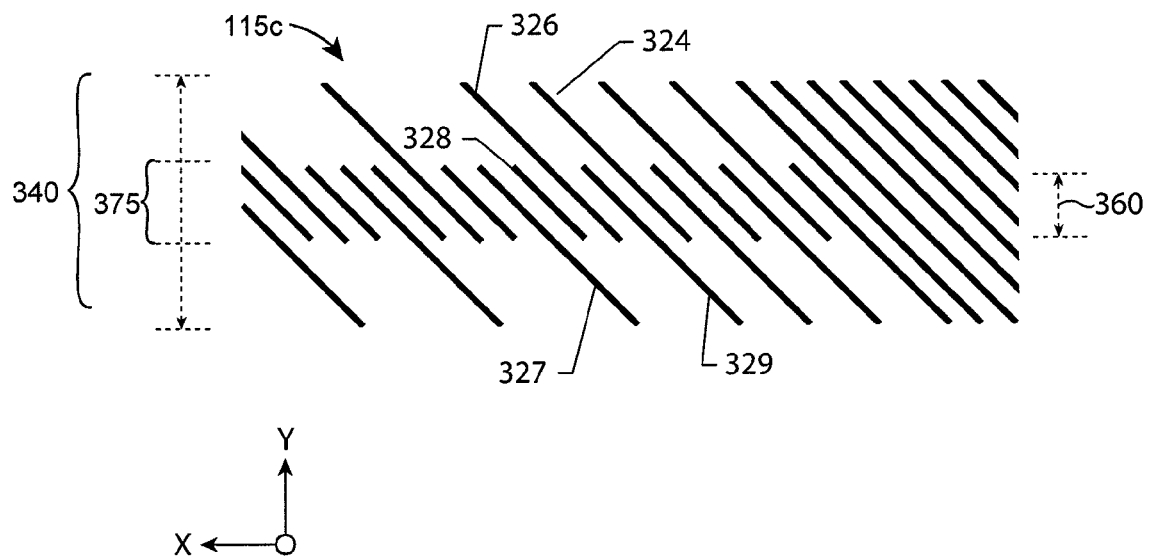

FIG. 3c shows another example partial magnified view of reflective array 115c in zone 310 (as shown in FIG. 2b), configured in accordance with some embodiments. Reflective array 115c shown in FIG. 3c is merely an example reflective array, and the discussion herein may be applicable to other reflective arrays 115. In some embodiments, one or more major reflector elements of a major reflective array be semi-major reflector elements, such as semi-major reflector elements 326 and 327. Semi-major reflector element 326 is a top semi-major reflector element in that its length runs from the bottom of a waveguide reflector element, such as waveguide reflector element 328, to the top of major width dimension 340. Semi-major reflector element 327 is a bottom semi-major reflector element in that its length runs from the top of a waveguide reflector element, such as waveguide reflector element 328, to the bottom of major width dimension 340. In that sense, top semi-major reflector element 326 and bottom semi-major reflector element 327 may collectively define major width dimension 340 and/or waveguide width dimension 360. The terms "top" and "bottom" are used herein with respect to reflective array 115c as viewed from the orientation as shown in FIG. 3c.

In some embodiments, the semi-major reflector elements may be staggered in that a top semi-major reflector element is not a neighbor to another top semi-major reflector element and a bottom semi-major reflector element is not a neighbor to another bottom semi-major reflector element. For example, top semi-major reflector element 326 is a neighbor to waveguide reflector element 328 and bottom semi-major reflector element 329. In another example, bottom semi-major reflector element 329 is a neighbor to top semi-major reflector elements 324 and 326.

Figure 3D:
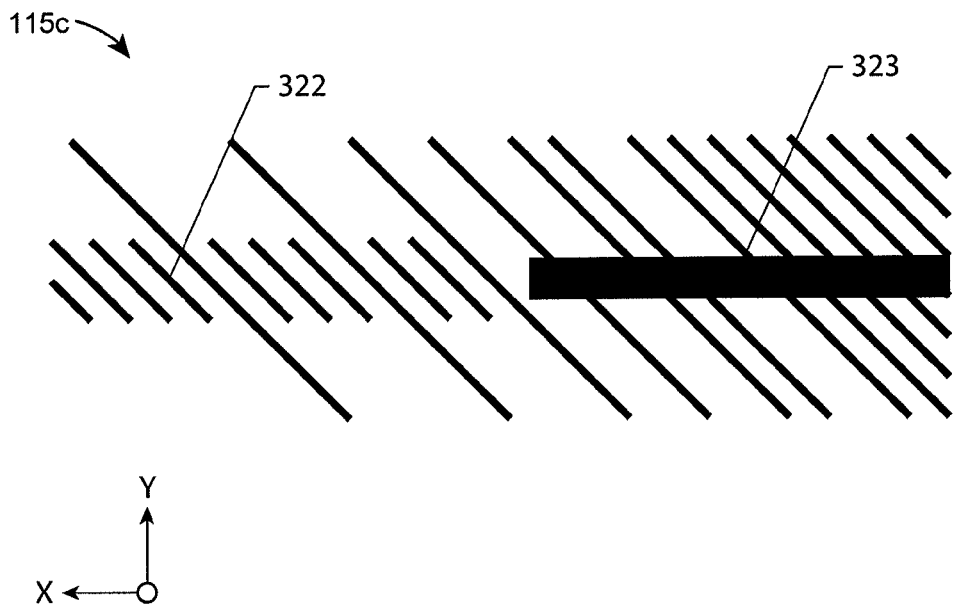

FIG. 3d shows another example partial magnified view of reflective array 115c in zone 310 (as shown in FIG. 2b), configured in accordance with some embodiments. Reflective array 115c as shown in FIG. 3d is also only an example reflective array and the discussion herein may be applicable to other reflective arrays 115. In some embodiments, reflective array 115 may include a waveguide reflective array, such as waveguide reflective array 322, and a solid core waveguide, such as solid core waveguide 323. Solid core waveguides are discussed in greater detail in commonly-assigned U.S. Pat. No. 6,636,201, incorporated by reference above.

As discussed above, reflective array 115c in zone 310 is further from transmitting transducer 110b than in zone 305 (as shown in FIG. 2b), the major reflector elements may have center-to-center spacings that are closer together than in zone 305. When the center-to-center spacings of the major reflector elements are λ (i.e., where n is 1 in Equation 3) or close to λ (i.e., where n is small but greater than 1 in Equation 3), there is little room left for waveguide reflector elements. Thus, solid waveguide core 323 may be disposed instead of the waveguide reflector elements and/or define one or more portions of the waveguide reflective array. In some embodiments, a waveguide core may be disposed along a first length portion of a reflective array while a waveguide reflective array may be disposed along a second length portion of the reflective array.

FIG. 4a shows a schematic graph of acoustic energy distribution for surface acoustic wave 405 along major width dimension 410 for a reflective array that does not include a waveguide reflective array. For comparison, FIG. 4b shows a schematic graph of acoustic energy distribution for surface acoustic wave 415 along major width dimension 410 for a reflective array that includes a waveguide reflective array having waveguide width dimension 420. As discussed above, the waveguide reflective array having waveguide width dimension 420 acts as a core region that concentrates a greater portion of the acoustic energy of surface acoustic wave 415 within major width dimension 410. Thus, beam width 430 of surface acoustic wave 415 may be thinner than beam width 425 of surface acoustic wave 405.

As shown in FIG. 4b, the presence of the waveguide reflective array having waveguide width dimension 420 may cause major reflector width dimension 410 to be larger than beam width 430 of surface acoustic wave 415. In some embodiments, optimal array performance may be achieved by reducing major reflector width dimension 410, allowing some of the acoustic wave energy to propagate outside of major reflector width dimension 410. FIG. 4c shows a schematic graph of acoustic energy distribution for surface acoustic wave 435 along major width dimension 440 for a reflective array that includes the waveguide reflective array having waveguide width dimension 420. Major width dimension 440 is smaller than major width dimension 410. However, the presence of the waveguide reflective array having waveguide width dimension 420 concentrates the acoustic energy of surface acoustic wave 435 such that beam width 445 is smaller than beam width 425. In other words, the fraction of the surface acoustic wave 435 intercepted by major reflector elements having major width dimension 440 remains sufficient for touch sensing purposes despite the fact that major width dimension 440 is smaller than major width dimension 410. As such, major width dimension 340, in units of wavelength, of reflective array 115c may be less than $\sqrt{(\lambda*L)}$ given by Equation 1 above.

FIG. 5a shows a reflective array 500 that includes major reflective array 515 and waveguide reflective array 520, configured in accordance with some embodiments. Major reflective array 515 may include a major width dimension 540 having a center third 575. Waveguide reflective array 520 may include a waveguide width dimension 525 having a waveguide centerline 570, which is disposed at the topmost of center third 575 of major width dimension 540. FIG. 5b shows a schematic graph of acoustic energy distribution for surface acoustic wave 505 along major width dimension 540. As shown, acoustic energy of surface acoustic wave 505 is concentrated near centerline 575 and offset from the center of major width dimension 540. Thus, waveguide reflective array 515 may be configured to concentrate acoustic energy of surface acoustic wave 505 at different portions of major width dimension 540.

In some embodiments, one or more of the major reflector elements and/or one or more of the waveguide reflector elements may include a focusing shape. As used herein, "focusing-shaped" reflector elements are reflector elements that tend to concentrate acoustic wave energy towards the center of the reflector elements. FIG. 6a shows an example reflective array 600 that includes lens-shaped reflector elements having a parabolic profile. FIG. 6b shows an example reflective array 605 that includes diamond-shaped reflector elements. These and other possible focusing-shaped reflector elements are described in further detail in commonly-owned U.S. Pat. No. 7,274,358 to Kent for "Focusing-shaped Reflector Arrays for Acoustic Touchscreens," which is incorporated by reference in its entirety herein and for all purposes. As discussed, any or all of the waveguide reflector elements and/or major reflector elements may include a focusing shape. For example, two waveguide reflector elements may have different focusing shapes. Similarly, two major reflector elements may have different focusing shape. In some examples, the shape and/or focusing shape of at least one major reflector element may be different from the shape and/or focusing shape of at least one waveguide reflector element.

FIG. 7a shows a simplified cross-sectional view of an example touch sensor device 700, which may be a touch monitor, a touch computer, a touch video display, a touch mobile device, and/or any other suitable machine having touch-input functionality. Touch device 700 may include substrate 105, acoustically benign layer 705, transducers 110, reflective arrays 115, display device 710, touch controller 715 and housing 720, among other things.

Display device 710 may be, for example, a liquid crystal display (LCD), organic light emitting device (OLED) display, electrophoretic display (EPD), vacuum fluorescent, cathode ray tube, and/or any other display component. In some embodiments, display device 710 may provide a graphical user interface compatible with touch inputs. Display device 710 may be positioned such that it is visible through substrate 105, thereby enabling a person viewing front surface 120 of substrate 105 to see display device 710 through substrate 105.

In some embodiments, back surface 125 of substrate 105 may be mechanically bonded to display device 710 via acoustically absorptive bonding layer 725. Layer 725 may be disposed along the edges of display device 710. In addition to its mechanical bonding function, layer 725 may be configured to prevent surface acoustic waves from improperly propagating across back surface 125, which may lead to interference at receiving transducers 115. In other words, layer 725 may act as a boundary in which surface acoustic waves propagating in border regions 145 at back surface 125 are strongly attenuated. As such, it may be desirable to concentrate acoustic wave energy propagating along reflective arrays away from layer 725. As shown in FIG. 5b, waveguide centerline 570 of waveguide reflective array 520 may be disposed away from the center of major width dimension 525 to concentrate acoustic energy of surface acoustic wave 505 away from layer 725.

Alternatively or additionally, back surface 125 of substrate 105 may be mechanically bonded to housing 720 via an acoustically absorptive bonding layer (not shown). The layer may also be configured to prevent surface acoustic waves from improperly propagating across back surface 125, which may lead to interference at receiving transducers 115. As such, a waveguide centerline of a waveguide reflective array may be disposed away from the center of a major width dimension to concentrate acoustic energy of a surface acoustic wave away from the layer bonding substrate 105 to housing 720.

FIG. 7b shows another simplified cross-sectional view of an example touch sensor device 700, configured in accordance with some embodiments. As shown, substrate 105 is mechanically bonded to display device 710 via absorptive bonding layer 725 and acoustically benign layer 705. Acoustically benign layer 705, on which transducer 110 and reflective array 115 are disposed, hide from view not only transducer 110 and reflective array 115 but also absorptive bonding layer 725. In some embodiments, layer 705 does not need to be acoustically benign where it is in contact with layer 725. However, a common acoustically benign layer 705 that hides transducer 110, reflective array 115 and absorptive bonding layer 725 may provide manufacturing economy and cosmetic uniformity, in accordance with some embodiments.

Returning to FIG. 7a, touch controller 715 may be configured to control transducers 110 and to determine touch coordinates. The operation of touch controller 715 is discussed further below with respect to FIG. 8-9.

Housing 720 may contain and protect display device 710, layer 705, transducers 110, reflective arrays 115, touch controller 715, as well as other components of the device that are not shown to avoid unnecessarily overcomplicating the drawings. In some embodiments, one or more of the components of touch device 700 may be attached via housing 720.

FIG. 8 shows a block diagram of an example control system 800 for a touch sensor device, configured in accordance with some embodiments. Control system 800 may include touch controller 715, main controller 805, transducers 110 and display device 710.

Touch controller 715 may include one or more processors 715a configured to execute firmware or software programs stored in one or more memory devices 715b to perform the functionality described herein. Touch controller 715 may be coupled via wires, leads, and/or by any other suitable manner to transducers 110 to control the transmission and reception of surface acoustic waves, such as those discussed above.

Touch controller 715 may further be configured to determine touch coordinates on the touch region based on the timing of an attenuation received at a receiving transducer, such as receiving transducer 110c or receiving transducer 110d discussed above.

In some embodiments, touch controller 715 may interface with a computer system, such as a personal computer, embedded system, kiosk, user terminal, and/or other machine as a human-to-machine interface device. The computer system may include main controller 805 with one or more processors 805a configured to execute firmware or software programs stored in one or more memory devices 805b. Via the execution of the programs, main controller 805 may generate a visual component (and/or display element) that is sent to display device 710 for display. The visual component may include or comprise a user interface that is operable using the touch sensor.

The computing system may further include other display devices, audio input and/or output capability, keyboard, electronic camera, other pointing input device, or the like (not shown). The computer system may operate using custom software, but more typically may use a standard and/or other type of operating system. In examples where the computing system is configured to enable use of other user input devices, the touch sensor may be employed as a primary or secondary input device.

Main controller 805 may be communicatively connected with touch controller 715. In some embodiments, touch coordinates and/or position information may be sent from touch controller 715 to main controller 805, allowing a user to interact with a program executing on main controller 805 via the touch sensor. In some embodiments, touch controller 715 may be further configured to map the touch coordinates to appropriate control actions that are sent to main controller 805. For example, a multi-dimensional dataset (such as a two dimensional table) may be used to associate timing information of a surface acoustic wave attenuation with one or more coordinates representing a physical location of the sensor. In some embodiments, touch controller 715 may transmit (x,y) touch coordinates to main controller 805.

While FIG. 8 shows touch controller 715 as a separate device from main controller 805, a single controller may be configured to perform all of the functions described herein. For example, touch controller 715 and main controller 805 may be integrated in an embedded system in some embodiments.

In some embodiments, each processing/controlling component (e.g., processor 715a and/or processor 805a) of control system 800 may be embodied as, for example, circuitry or other type of hardware elements (e.g., a suitably programmed processor, combinational logic circuit, and/or the like). The processing/controlling components may be configured by a computer program product comprising computer-readable program instructions stored on a non-transitory computer-readable medium (e.g., memory 715b and/or memory 805b) that is executable by a suitably configured processing device (e.g., processor 715a and/or processor 805a), or some combination thereof.

Processor 715a and/or processor 805a may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as single processors, processor 715a and/or processor 805a may comprise a plurality of processors in some embodiments. The plurality of processors may be embodied on a single computing device or may be distributed across a plurality of computing devices collectively configured to function as a processing module of control system 800. The plurality of processors may be in operative communication with each other and may be collectively configured to perform one or more functionalities of control system 800 as described herein.

Whether configured by hardware, firmware/software methods, or by a combination thereof, processor 715a and/or processor 805a may comprise an entity capable of performing operations according to various embodiments while configured accordingly. Thus, for example, when processor 715a and/or processor 805a are embodied as an ASIC, FPGA or the like, processor 715a and/or processor 805a may comprise specifically configured hardware for conducting one or more operations described herein. Alternatively, as another example, when processor 715a and/or processor 805a are embodied as an executor of instructions, such as may be stored in memory 715b and/or memory 805b, the instructions may specifically configure processor 715a and/or processor 805a to perform one or more algorithms and operations described herein.

Memory 715b and/or memory 805b may comprise, for example, volatile memory, non-volatile memory, or some combination thereof. Although illustrated in FIG. 8 as single memory components, memory 715b and/or memory 805b may comprise a plurality of memory components. The plurality of memory components may be embodied on a single computing device or distributed across a plurality of computing devices. In various embodiments, memory 715b and/or memory 805b may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 715b and/or memory 805b may be configured to store information, data, applications, instructions, or the like for enabling control system 800 to carry out various functions in accordance with some embodiments. For example, in at least some embodiments, memory 715b and/or memory 805b may be configured to buffer input data for processing by processor 715a and/or processor 805a. Additionally or alternatively, in at least some embodiments, memory 715b and/or memory 805b may be configured to store program instructions for execution by processor 715a and/or processor 805a. Memory 715b and/or memory 805b may store information in the form of static and/or dynamic information. This stored information may be stored and/or used by control system 800 during the course of performing its functionalities.

Embodiments have been described above with reference to a block diagram of circuitry. Below is a discussion of an example process flowchart describing functionality that may be implemented by one or more components of circuitry, such as those discussed above in connection with control system 800 in combination with touch sensor 100. Each block of the circuit diagrams and process flowchart, and combinations of blocks in the circuit diagrams and process flowchart, respectively, may be implemented by various means including computer program instructions. These computer program instructions may be loaded onto a general purpose computer, special purpose computer, or other programmable data processing apparatus, such as processor 715a or processor 805a discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 715b and/or memory 805b) that may direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, may be implemented by special purpose hardware-based computer systems that perform the specified functions or steps, or combinations of special purpose hardware and computer instructions.

FIG. 9 shows an example of a method 900 for determining a coordinate of a touch event on a sensor, performed in accordance with some embodiments. The coordinate of the touch even may at least partially represent a physical location on the sensor where the touch event occurred. For instance, the coordinate of the touch event may be along a sensing axis, such as the X-axis or Y-axis. Thus the coordinate of touch may determine a physical location on the sensor along the X-axis or the Y-axis.

While method 900 is described in detail where the coordinate of the touch is along the Y-axis (i.e., to determine Y-axis touch coordinates), a similar technique may be used where the sensing axis is the X-axis. Thus a coordinate pair may be determined by repeating and/or alternating method 900 for both the X and Y sensing axes, or more generally, any set of orthogonal or otherwise-situated sensing axes.

In some embodiments, method 900 may be performed by the example structures shown in FIGS. 1-3d, 5a and 6a-8. For instance, circuitry such as touch controller 715 or main controller 805 may be configured to perform method 900. For clarity, method 900 may be described with reference to elements shown in these figures. It will be appreciated, however, that other structures may be used to perform method 900 in other embodiments.

Method 900 may start at 905 and proceed to 910, where circuitry may generate an electrical excitation signal. For example, circuitry such as touch controller 715 or main controller 805 may be configured to generate the excitation signal. In some embodiments, the excitation signal may be a sinusoidal wave or a pseudo sinusoidal wave tone burst at a desired frequency.

At 915, the circuitry may transmit the electrical excitation signal to a transmitting transducer that is configured to transform the electrical excitation signal into at least one acoustic wave. As discussed above, the transmitting transducer (such as transducer 110a, 110b discussed above) may include electrodes connected with the circuitry, a piezoelectric element, and a coupling block in some embodiments. The electrical excitation signal may be applied by the circuitry to the electrodes to cause a piezoelectric element in the transmitting transducer to vibrate. Vibration of the piezoelectric element may generate bulk waves in the coupling block which in turn couple to the substrate as surface acoustic waves.

At 920, the circuitry may receive an electrical return signal from a receiving transducer that is configured to transform the acoustic wave into the electrical return signal. Also as discussed above, the receiving transducer (such as transducer 110c, 110d) may include electrodes connected with the circuitry, a piezoelectric element, and a coupling block in some embodiments. Acoustic waves coupled to the substrate may cause vibrations in the piezoelectric element via the coupling block, which in turn causes an oscillation voltage to appear on the electrodes. The circuitry may receive the electrical return signal via the electrodes.

The electrical return signal may represent the acoustic wave subsequent to its propagation through the sensor. Thus, an attenuation in the acoustic wave, as may be caused by a touch event that occurred while the acoustic wave propagated through the sensor, may cause a corresponding attenuation in the electrical returned signal.

FIGS. 2a and 2b show an example of multi-ray propagation paths of an acoustic wave through an example sensor. This discussion of FIG. 2a or FIG. 2b may occur subsequent to 915 and prior to 920 of FIG. 9.

In some embodiments, transmitting transducer 110a may transmit acoustic wave 170 in a prevailing direction along reflective array 115a. Reflector elements of reflective array 115a may scatter the acoustic wave transmitted along reflective array 115a into rays, such as rays 175 and 176, that propagate from back surface 125 of substrate 105, around a back surface left edge 160a and front surface left edge 150a via connecting surface 130, across the front surface 120 in a prevailing direction that is perpendicular to the sensing axis, and around front surface right edge 150b and back surface right edge 160c via connecting surface 130, to back surface 120. The reflector elements of reflective array 115b may then direct the rays of acoustic wave 175 in a prevailing direction along reflective array 115b to receiving transducer 110c. Receiving transducer 110c may then transform acoustic wave 175 into the electrical return signal.

As rays 175 and 176 propagate across touch region 205 on front surface 120, a touch event within touch region 205 may cause at least one attenuation in acoustic wave 175 that may be received at receiving transmitter 110c. To provide complete coverage within the entire touch region 205, the rays of surface acoustic wave 175 may be scattered by reflective array 115a such that they span at least the sensing axis (e.g., the Y-axis in the example shown in FIG. 2a) in touch region 205. Put another way, acoustic wave 175 may be directed such that at least some of its acoustic energy propagates along the entire touch region 205 as rays. This allows a touch event anywhere within touch region 205 to perturb and attenuate the acoustic wave as it travels across touch region 205. Rays 175 and 176 may then be recombined into a return acoustic wave by reflective array 115b.

Returning to FIG. 9, at 925, the circuitry may process the electrical return signal received at 920. Processing the electric return signal may be performed to determine a coordinate of a touch event on the sensor in touch region 205. As discussed above, the coordinate may at least partially represent (i.e., along one sensing axis) a physical location on the sensor where the attenuation occurred. Method 900 may then end at 930.

In some embodiments, processing the electrical return signal may include determining a timing of each attenuation included in the return acoustic wave. In such embodiments, the circuitry may determine an actual time for when the transmitting transducer transmits the acoustic wave and actual times for when the receiving transducer receives each ray. The propagation time for each ray may be determined by subtracting the actual time for when the transmitting transducer transmits the acoustic wave from the actual times for when the receiving transducer receives each ray. A relative time for each ray may be determined by subtracting the shortest propagation time of the rays from the propagation time for each ray.

With reference to FIGS. 2a and 2b, rays of acoustic wave 170 may have varying propagation path lengths between transmitting transducer 110a and receiving transducer 110c. When the wave velocity of the rays is constant or substantially constant through the sensor, the varying propagation path lengths may result in varying propagation times between transmitting transducer 110a and receiving transducer 110c corresponding with the varying propagation path lengths. As discussed in further detail below, different rays of surface acoustic wave 175 may be associated with different locations along the sensing axis. Thus, an attenuation at a particular time or times in the electrical return signal, corresponding with an attenuation in a least one particular ray, may be mapped or otherwise associated (e.g., mathematically using a time function) to a particular location along the sensing axis where the attenuation occurred.

For example, acoustic wave 170 is scattered into example rays 175 and 176. The total acoustic path including ray 175 traverses a first distance from transmitting transducer 110a along reflective array 115a, a second distance from reflective array 115a around substrate 105 to reflective array 115b, and the first distance along reflective array 115b to receiving transducer 110c.

In comparison, the acoustic path including ray 176 of acoustic wave 170 traverses a third distance from transmitting transducer 110a along reflective array 115a, a the second distance from reflective array 115a around substrate 105 to reflective array 115b, and the third distance along reflective array 115b to receiving transducer 110c.

As shown, the total distance, and thus total propagation time, between transmitting transducer 110a and receiving transducer 110c is shorter for the acoustic path including ray 175 than the acoustic path including ray 176 because the first distances are shorter than the third distances. Thus an attenuation in ray 175, corresponding with Y-coordinate 825 will be received at receiving transducer at an earlier time than an attenuation in ray 176, corresponding with Y-coordinate 830. As discussed above, the receiving transducer may transform the acoustic wave into the electrical return signal at 920 such that the electrical return signal represents the acoustic wave including the attenuation.

In some embodiments, processing the electrical return signal may further include mapping the timing of the attenuation to a coordinate of the sensor. As discussed above, the coordinate may at least partially represent a physical location (e.g., one coordinate along the sensing axis, such as Y-coordinate 825 or Y-coordinate 830 shown in FIG. 2b) on the sensor where an attenuation occurred, which may represent a touch event. For example, an attenuation in ray 175 will arrive at a first time that is before an attenuation in ray 176. As such, the circuitry may be configured to associate an attenuation at the first time with Y-coordinate 825 and an attenuation at the second time with Y-coordinate 830. Similarly, an attenuation at any unique Y-coordinate within touch region 205 will be received at a unique time at receiving transducer 110c, and thus the timing of the attenuation may be mapped to a coordinate of the sensor.

In some embodiments, the circuitry may be further configured to associate the coordinate determined by method 900 with a display element shown on a display device, such as display device 710 shown in FIGS. 7a, 7b and 8. The display device may be configured to present the display element while the acoustic wave propagates through the sensor. The display element may be part of a user interface of a program. As such, associating the coordinate with the display element may include determining that a user has indicated a desire to select the display element.

While method 900 has been discussed in connection with a Y-axis touch coordinate, a similar approach may also be used for determining an X-axis touch coordinate. The X-axis coordinate may at least partially represent a physical location on the sensor where the attenuation occurred, more specifically, the physical location along the X-axis of the attenuation. The X-axis and Y-axis coordinate may define a coordinate pair of a touch event.

For example, two pairs of transducers may be provided respectively for the X and Y axes. Thus transmitting transducer 110b and receiving transducer 110d, as shown in FIGS. 2(a) and 2(b), may be used with method 900 for determining an X-coordinate along the X-axis. With reference to FIG. 9, the method may begin at 905 and proceed to 910, where the circuitry may generate a second electrical excitation signal. At 915, the circuitry may transmit the second electrical signal to a second transmitting transducer, such as transmitting transducer 110b, that is configured to transform the second electrical excitation signal into at least one second acoustic wave. At 920, the circuitry may receive a second electrical return signal from a second receiving transducer, such as receiving transducer 110d, where the second electrical return signal represents the second acoustic wave including a second attenuation that occurred while propagating through the sensor. At 925, the circuitry may process the second electrical return signal to determine a second coordinate (e.g., the X-axis coordinate) of a touch event on the sensor in touch region 205. The second coordinate and the first coordinate (i.e., the Y-axis coordinate) may comprise a coordinate pair. For example, the circuitry may be configured to then associate the coordinate pair with a display element shown on the display device. As such, the display device may be configured to present the display element while the first and second acoustic waves propagate through the sensor. The circuitry may be further configured to determine that a user has indicated a desire to select the display element, and method 900 may then end at 930.

FIG. 10 shows an example touch sensor 1000 including transducers 1010 (e.g., transmitting transducers 1010a and 110b and receiving transducers 110c and 110d) and reflective arrays 1015 (e.g., reflective arrays 1015a, 1015b, 1015c and 1015d) disposed on front surface 1020 of substrate 105. Using the techniques described above with reference to FIGS. 3a-6b, reflective arrays 1015 may be configured to allow border regions 1055a, 1055b, 1055c, and/or 1055d to be made thinner, preferably less than 10 mm, more preferably less than 6 mm, and for some applications preferably less than 3 mm.

Transmitting transducer 1010a may be configured to generate and transmit Y-coordinate surface acoustic waves (i.e., surface acoustic waves traveling along the X-axis on front surface 1020 used for determining Y-axis coordinates of a touch event), such as surface acoustic wave 1070, in a prevailing direction along reflective array 1015a positioned along border region 1055a of front surface 1020. Surface acoustic wave 1070 may be scattered along the X-axis across front surface 1020 and be used to determine Y-axis coordinate(s) of a touch event. Reflector elements of reflective array 1015a (including major reflector elements and waveguide reflector elements) may scatter surface acoustic wave 1070 as the wave travels from the beginning to the end of reflective array 1015a. The scattered rays (such as ray 1075 and ray 1076) may move generally in the negative X-axis direction (i.e., perpendicular to the sensing Y-axis) as small portions of the wave's energy (e.g., 1% at a time) across front surface 1020 toward arrays in left border region 1055b, where the rays are merged as a return acoustic wave by reflective array 1015b positioned along left border region 1055b. Next, reflector elements of reflective array 1015b may direct the scattered, returned surface acoustic wave 1070 along reflective array 1015b to receiving transducer 1010c.

Similar to the discussion above regarding Y-coordinate surface acoustic waves, transmitting transducer 1010b may be configured to generate and transmit X-coordinate surface acoustic waves (i.e., surface acoustic waves traveling along the Y-axis on front surface 1020 used for determining X-axis coordinates of a touch event), such as surface acoustic wave 1080, in a prevailing direction along reflective array 1015c positioned along border region 1055c. Reflector elements of reflective array 1015c may scatter surface acoustic wave 1080 as rays (such as rays 1085 and 1086) while the wave travels from the beginning to the end of reflective array 1015c. Each of the surface acoustic wave rays of surface acoustic wave 1080 may ripple toward the positive Y-axis direction (i.e., perpendicular to the sensing X-axis) across front surface 1020 to reflective array 1015d positioned along border region 1055d on front surface 1020. Next, reflector elements of reflective array 1015d may direct the scattered surface acoustic wave 1080 along reflective array 1015d to receiving transducer 1010d.

In some embodiments, a bezel (not shown) is disposed along one or more border regions 1055. Without a bezel, reflective arrays 1015 and transducers 1010 may be visible to a user when disposed on front surface 1020 of touch sensor 1000. As such, the techniques discussed above for thinner border regions may also be leveraged to create thinner bezels that cover the reflective arrays and/or transducers from view.

FIG. 11 shows an example of a method 1100 for manufacturing an acoustic touch apparatus, performed in accordance with some embodiments. As such, an acoustic touch apparatus may be prepared using method 1100. While method 1100 is described for a touch sensor having reflective arrays on the back surface of a substrate, a similar technique may be used to dispose reflective arrays on the front surface.

Method 1100 may start at 1105 and proceed to 1110, where a substrate configured to propagate surface acoustic waves may be provided. The substrate may have a front surface, a back surface, and a connecting surface joining the front surface and the back surface. In one example, a suitable substrate (e.g., having suitable thickness, opacity, acoustic response, or the like) such as substrate 105 as shown in FIG. 1 may be used. In some examples, the substrate may be made of glass and formed by a float process but other techniques may be used. In another example, an off-the-shelf substrate (e.g., a glass) may be provided at 1105.

At 1115, a mask (for example a printing screen) including open spaces that define one or more reflective arrays may be positioned to the back surface of the substrate. A reflective array, as defined by the opening spaces, may include a major reflective array and a waveguide reflective array disposed in accordance with one or more techniques described above. As such, method 1100 may further include defining the mask in accordance with one or more techniques described above.

At 1120, an acoustically reflective material (when cured), such as glass frit, may be applied to the substrate such that the acoustically reflective material is disposed on the back surface of the substrate in the open spaces. At 1125, the substrate including the disposed glass fit is cured, such as in an oven, to permanently form the reflective array. As such, both the major reflective array and the waveguide reflective array can be created in a single application of the acoustically reflective material. Using method 1100, a single pass screen printing and curing technique may be used to form both major reflector elements and waveguide reflector elements of the major reflective array and the waveguide reflective array, respectively.

In some embodiments, an acoustically benign layer, may be applied to the substrate (e.g., at one or more border regions) prior to positioning the screen to the back surface at 1115. The acoustically benign layer may be disposed between the back surface of the substrate and the reflective array to the hide reflective array from view at the front surface. As such, applying acoustically reflective material to the substrate at 1120 may be performed on the acoustically benign layer. Method 1100 may end at 1130.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An acoustic touch apparatus, comprising:
a substrate configured to propagate surface acoustic waves, the substrate having:
a front surface;
a back surface; and
a reflective array including array reflector elements configured to redirect at least a portion of the surface acoustic waves, the array reflector elements disposed such that a center-to-center spacing between adjacent array reflector elements defines a distance equal to at least one positive integer multiple of the surface acoustic waves' wavelength, the array reflector elements including major reflector elements and waveguide reflector elements, the reflective array comprising:
a major reflective array including the major reflector elements, wherein the major reflective array defines a major width dimension; and
a waveguide reflective array including the waveguide reflector elements, wherein:
the waveguide reflective array defines a waveguide width dimension that is smaller than the major width dimension;
at least one of the waveguide reflector elements is disposed between two of the major reflector elements;
the waveguide reflective array defines a waveguide centerline at the middle of the waveguide width dimension; and
the waveguide reflective array is positioned relative to the major reflective array such that the waveguide centerline is within a center third of the major width dimension,
wherein the waveguide reflective array provides a core region to concentrate energy of the surface acoustic waves near the waveguide centerline of the waveguide reflective array and the major reflective array provides a cladding region outside of the core region such that the surface acoustic waves propagate slower in the core region than the cladding region.

2. The acoustic touch apparatus of claim 1, wherein the waveguide centerline is within the middle of the major width dimension.

3. The acoustic touch apparatus of claim 1, wherein the at least one of the waveguide reflector elements has a reflector angle at least substantially parallel to reflector angles of at least one of an adjacent waveguide reflector element and an adjacent reflector element.

4. The acoustic touch apparatus of claim 1, wherein:
the waveguide reflector elements are disposed within regions defined by center-to-center spacing between major reflector elements that are neighboring such that each of the waveguide reflector elements forms a center-to-center interval with at least one of an adjacent waveguide reflector element or an adjacent major reflector element; and the center-to-center interval is equal to at least one positive integer multiple of the surface acoustic waves' wavelength.

5. The acoustic touch apparatus of claim 1, wherein at least one of the waveguide reflector elements includes a focusing shape.

6. The acoustic touch apparatus of claim 1, wherein at least one of the major reflector elements includes a focusing shape.

7. The acoustic touch apparatus of claim 1, wherein:
the waveguide reflective array further includes semi-major reflector elements that are staggered relative to each other; and
the major reflective array and the waveguide reflective array comprise and are defined by the two or more semi-major reflector elements.

8. The acoustic touch apparatus of claim 1, wherein at least two of the major reflector elements are neighboring and are substantially parallel to each other.

9. The acoustic touch apparatus of claim 1 further comprising a transmitting transducer configured to generate and propagate the surface acoustic waves in a prevailing direction along the major reflective array and the waveguide reflective array and wherein:
the substrate includes a curved connecting surface joining the front surface and the back surface;
the transmitting transducer is coupled to the back surface; and
the reflective array is configured to cause the surface acoustic waves to propagate from the back surface, via the connecting surface, and to the front surface; and
wherein the major reflector elements are disposed such that:
center-to-center spacings between major reflector elements that are neighboring have a distance equal to positive integer multiples of the surface acoustic waves' wavelength; and
the center-to-center spacings between the major reflector elements that are neighboring are comparatively greater at a first portion of the major reflective array closer to the transmitting transducer and smaller at a second portion of the major reflective array farther from the transmitting transducer.

10. The acoustic touch apparatus of claim 1, further comprising a receiving transducer configured to receive the surface acoustic waves propagating in a prevailing direction along the major reflective array and the waveguide reflective array and wherein:
the substrate includes a curved connecting surface joining the front surface and the back surface;
the receiving transducer is coupled to the back surface; and
the reflective array is configured to cause the surface acoustic waves to propagate to the receiving transducer; and
wherein the major reflector elements are disposed such that:
center-to-center spacings between major reflector elements that are neighboring have a distance equal to positive integer multiples of the surface acoustic waves' wavelength; and
the center-to-center spacings between the major reflector elements that are neighboring are comparatively smaller at a first portion of the major reflective array further from the acoustic wave transducer and larger at a second portion of the major reflective array closer to the acoustic wave transducer.

11. The acoustic touch apparatus of claim 1, wherein:
the substrate includes at least one border region along an edge of the back surface of the substrate; and
the reflective array is disposed at the border region.

12. The acoustic touch apparatus of claim 1, further comprising a display device positioned such that the display device is visible through the front surface of the substrate, and wherein:
the back surface of the substrate is mechanically bonded to the display device via an acoustically absorptive bonding layer; and
the waveguide reflective array is configured to concentrate energy of surface acoustic waves propagating along the reflective array away from the acoustically absorptive bonding layer.

13. A method for manufacturing an acoustic touch apparatus, comprising:
providing a substrate configured to propagate surface acoustic waves, the substrate having:
a front surface;
a back surface; and
a connecting surface joining the front surface and the back surface;
positioning a mask including open spaces to the back surface of the substrate, wherein the open spaces define a reflective array including array reflector elements disposed such that a center-to-center spacing between adjacent array reflector elements defines a distance equal to at least one positive integer multiple of the surface acoustic waves' wavelength, the array reflector elements including major reflector elements and waveguide reflector elements, the reflective array including a major reflective array and a waveguide reflective array, wherein:
the major reflective array includes the major reflective elements;
the major reflective array defines a major width dimension;
the waveguide reflective array includes the waveguide reflector elements;
the waveguide reflective array defines a waveguide width dimension that is smaller than the major width dimension;
at least one of the waveguide reflector elements is disposed between two of the major reflector elements;
the waveguide reflective array defines a waveguide centerline at the middle of the waveguide width dimension; and
the waveguide reflective array is positioned relative to the major reflective array such that the waveguide centerline is within a center third of the major width dimension,
wherein the waveguide reflective array provides a core region to concentrate energy of the surface acoustic waves near the waveguide centerline of the waveguide reflective array and the major reflective array provides a cladding region outside of the core region such that the surface acoustic waves propagate slower in the core region than the cladding region;
applying an acoustically reflective material to the substrate such that the acoustically reflective material is disposed on the back surface in the open spaces; and
curing the substrate including the acoustically reflective material.

14. The method of claim 13, further comprising defining the mask such that the waveguide centerline is within the middle of the major width dimension.

15. The method of claim 13, further comprising defining the mask such that the least one of the waveguide reflector elements has a reflector angle at least substantially parallel to reflector angles of at least one of an adjacent waveguide reflector element and an adjacent major reflector element.

16. The method of claim 15, further comprising defining the mask such that at least one of the waveguide reflector elements, at least one of the major reflector elements, or both include a focusing shape.

17. The method of claim 13, further comprising defining the mask such that:
the waveguide reflector elements are disposed within regions defined by center-to-center spacing between neighboring major reflector elements such that each of the waveguide reflector elements forms a center-to-center interval with at least one of an adjacent waveguide reflector element or an adjacent major reflector element; and
the center-to-center interval is equal to at least one positive integer multiple of the surface acoustic waves' wavelength.

18. An acoustic touch apparatus prepared by a process, comprising:
providing a substrate configured to propagate surface acoustic waves, the substrate having:
a front surface;
a back surface; and
a connecting surface joining the from surface and the back surface;
positioning a mask including open spaces to the back surface of the substrate, wherein the open spaces define a reflective array including array reflector elements disposed such that a center-to-center spacing between adjacent array reflector elements defines a distance equal to at least one positive integer multiple of the surface acoustic waves' wavelength, the array reflector elements including major reflector elements and waveguide reflector elements, the reflective array including a major reflective array and a waveguide reflective array, wherein:
the major reflective array includes the major reflective elements;
the major reflective array defines a major width dimension;
the waveguide reflective array includes the waveguide reflector elements;
the waveguide reflective array defines a waveguide width dimension that is smaller than the major width dimension;
at least one of the waveguide reflector elements is disposed between two of the major reflector elements;
the waveguide reflective array defines a waveguide centerline at the middle of the waveguide width dimension; and
the waveguide reflective array is positioned relative to the major reflective array such that the waveguide centerline is within a center third of the major width dimension,
wherein the waveguide reflective array provides a core region to concentrate energy of the surface acoustic waves near the waveguide centerline of the waveguide reflective array and the major reflective array provides a cladding region outside of the core region such that the surface acoustic waves propagate slower in the core region than the cladding region;

applying an acoustically reflective material to the substrate such that a glass frit is disposed on the back surface in the open spaces; and curing the substrate including the acoustically reflective material.

* * * * *